United States Patent

Uchino et al.

[11] Patent Number: 5,847,966
[45] Date of Patent: Dec. 8, 1998

[54] POWER ESTIMATION METHOD FOR AN INTEGRATED CIRCUIT USING PROBABILITY CALCULATIONS

[75] Inventors: Taku Uchino; Takashi Mitsuhashi, both of Kanagawa-ken, Japan

[73] Assignee: Kabushiki Kaisha Toshiba, Kawasaki, Japan

[21] Appl. No.: 616,994

[22] Filed: Mar. 14, 1996

[30] Foreign Application Priority Data

Mar. 15, 1995 [JP] Japan ................................. 7-055867

[51] Int. Cl.$^6$ ............................. G06F 17/50; G06F 17/00
[52] U.S. Cl. ......................... 364/489; 364/488; 364/490
[58] Field of Search .................................. 364/488–491, 364/578; 395/500

[56] References Cited

U.S. PATENT DOCUMENTS 5,557,531   9/1996   Rostoker et al. ..................... 364/489

OTHER PUBLICATIONS

Uchino et al. "Switching Activity Analysis using Boolean Approximation Method," IEEE, Nov. 1995, pp 20–25.
Najm "Power Estimation Techniques for Integrated Circuits," IEEE, 1995, pp. 492–499.
Najm "A Survey of Power Estimation Techniques in VSLI Circuits," IEEE, Aug. 94, pp. 446–455.
Hachtel et al. "Probabilitic Analysis of Large Finite State Machines," ACM/IEEE, 1996, pp. 270–275.
Vanoostende et al. "Estimation of Typical Power of Synchrinous CMOS Circuits Using a Hierarchy of Simulators, "IEEE, 1993, pp. 26–39.
Tsui et al. "Exact and Approximate Methods for Calculating Signal and Transition Probabilities in FSMs," ACM/IEEE, 1994, pp. 18–23.
Monteiro et al. "A Methodology for Efficient Estimation of Switching Activist, in Sequential Logic Circuits," ACM/IEEE, 1994, pp. 12–17.
Ercolani et al. "Estimate of Signal Probability in Combinational Logic Networks," IEEE, pp. 132–138. Apr. 1989.

*Primary Examiner*—Vincent N. Trans
*Assistant Examiner*—Vuthe Siek
*Attorney, Agent, or Firm*—Foley & Lardner

[57] ABSTRACT

A method of estimating power for an integrated circuit based on high speed probability calculation having a high precision with considering correlation between signals may be provided. The method may be performed by calculating probability quantity accompanying to output nodes of respective logical gates, the probability quantity being represented by probability that logical values of the output nodes of respective logical gates are 1 (referred to as "signal probability" hereinafter) and probability that logical values of the output nodes of respective logical gates are changed (referred to as "switching probability" hereinafter), expanding into series a difference $P_e - P_a$ between a strict value $P_e$ of the probability quantity and a value $P_a$ calculated based on supposition that all inputs of respective logical gates are independent, with respect to the probability quantity corresponding to entire input signals of the integrated circuit, and estimating power required for the integrated circuit by first calculating infinite number of terms in the series as a correction term and then employing a value obtained by adding the correction term to the value $P_a$ as an approximate value of the probability quantity.

10 Claims, 11 Drawing Sheets

FIG.11A

| TIME INTERVAL | SWITCHING PROBABILITY | | | |
|---|---|---|---|---|
| | AND1 | AND2 | AND3 | TOTAL SUM (1) |
| 1-4 | 2/4 | 0 | 2/4 | 1 |
| 5-8 | 2/4 | 3/4 | 3/4 | 8/4 |
| 9-12 | 0 | 3/4 | 3/4 | 6/4 |
| ⋮ | ⋮ | ⋮ | ⋮ | ⋮ |

FIG.11B

| TIME INTERVAL | SWITCHING PROBABILITY | | | |
|---|---|---|---|---|
| | AND1 | AND2 | AND3 | TOTAL SUM (1) |
| 1-4 | 1/2 | 0 | 1/2 | 1 |
| 3-4 | 1/2 | 0 | 1/2 | 1 |
| 5-6 | 1/2 | 1/2 | 1/2 | 3/2 |
| 7-8 | 1/2 | 1 | 1 | 5/2 |
| 9-10 | 0 | 1/2 | 1/2 | 1 |
| 11-12 | 0 | 1 | 1 | 2 |
| ⋮ | ⋮ | ⋮ | ⋮ | ⋮ |

POWER ESTIMATION METHOD FOR AN INTEGRATED CIRCUIT USING PROBABILITY CALCULATIONS

BACKGROUND OF THE INVENTION

1. Field of the Invention

The present invention relates to a power estimation method for an integrated circuit and, more particularly, a method of estimating power required for the integrated circuit by using signal probability, switching probability, etc. of logic circuits in the integrated circuit.

2. Description of the Related Art

Various causes for power consumption in integrated circuits, especially, CMOS integrated circuits, include, if classified roughly, power consumption due to leakage current, power consumption due to short circuit current, and power consumption due to charging/discharging.

The power consumption because of leakage current and short circuit current may be negligibly small in contrast to the power consumption due to charging/discharging. Therefore, when the power consumption must be estimated, it is effective that power consumption because of charging/discharging should be examined first. The power consumption because of charging/discharging denotes power consumed by the current which flows when charging/discharging operation of a capacitance for driving the nodes is caused by virtue of a change of electric potential (to be called as "switching" hereinafter) in a series of wirings (to be called "nets" or "nodes" hereinafter) of a circuit. The average power consumption Pow (Z) because of charging/discharging in the node Z can be roughly estimated by following equation (1).

$$Pow(Z) = \tfrac{1}{2} V_{DD}^2 C_z D(Z) \tag{1}$$

Where $V_{DD}$ is power-supply voltage, $C_z$ is capacitance for driving the node Z, and D(Z) is average value of switching times per unit time in the node Z (to be called as "transition density" hereinafter).

Particularly, in case the circuit is being operated in synchronization with a clock signal, we can write equation (1) in the form $$Pow(Z) = f V_{DD}^2 C_z N(Z) \tag{2}$$

where f is clock frequency, and N(Z) is average charging/discharging times per a clock signal. If $V_{DD}$ and $C_z$ are known, power consumption may be estimated by obtaining D(Z) according to the equation (1). A main subject for estimation of power consumption is to estimate the transition density D(Z). There are two ways for estimating the transition density, i.e., a way based on simulation as a first method and another way based on probability calculation as a second method.

In the first method, the transition density may be estimated by first inputting input pattern data (to be called as "test vector" hereinafter) to input terminals (to be called as "primary input" hereinafter) of the logic circuit, and then counting switching times in respective nodes in the circuit. In this method, if the longer test vectors is flown, the precision can be further improved, but increased execution or running time may result.

In the second method, without actually flowing the test vectors, propagation of the transition density to internal nodes may be estimated in terms of probability calculation by only providing information concerning the transition density of respective primary inputs. In other words, propagation of input probability quantity concerning the primary inputs of the circuit, e.g., signal probability that a logical value of the signal is 1 and switching probability that a logical value of the signal changes, to the internal nodes may be examined, then power consumption Pow may be calculated according to following equation (3) after calculation of switching probability Psw in respective nodes.

$$Pow = P_{sw} Pow(/\text{switch}) \tag{3}$$

Where $P_{sw}$ is probability that a logical value of the signal changes (to be also called as "switching probability" or "operating probability"), and Pow(/switch) is power consumption accompanying to one change of the signal. In this method, execution time may be relatively lessened since the test vectors are not needed in principle, but there are problems to handle reconvergence of signal, sequential circuit, and internal floating nodes.

The reconvergence of signal means that, under the condition that a certain node serves as input nodes of several logic gates, outputs of these logic gates coincide with an input of the same logic gate if the outputs are being sequentially retraced. At this time, two different input nodes of the inputs of the logic gates depend upon the same primary input. In general, if sets of the primary inputs upon which two different nodes A, B depend have common part being not empty, it may be concluded that correlation of the signals exists between the nodes A, B or simply there is correlation between the nodes A, B. Thus, if two nodes having correlation between signals in the input nodes of a certain logic gate, the reconvergence of signal has occurred. In such case, to calculate strict transition density of the output nodes of the certain gate, it must be checked whether or not the signals starting from the same node have reached the certain gate via two different routes or more. If so, it becomes impossible to calculate the strict transition time within actually limited time since complexity of calculation is increased exponentially.

In the sequential circuit, a case will happen that the output of the certain gate enters into the own gate after it has come around. For this reason, since the transition density in the nodes of such loop depends upon its own gate, the transition density can not be grasped by virtue of a conception of propagation of the transition density from the input to the output, which renders calculation of the transition density difficult.

The internal floating node causes indefinite theoretical value such as high impedance state, which also renders calculation of the transition density difficult. The problem of the reconvergence of signal is most important in principle. It has been known that, to solve strictly the problem, execution time being increased exponentially is required, so that it is infeasible to actually execute the strict solution. Therefore, only an approximate method may be used, but the following algorithms have been proposed up to this time as such method.

(i) COP
(ii) DWAA (Dynamic Weighted Averaging Algorithm)
(iii) CCM (Correlation Coefficient Method)

COP as a first method is that entire inputs of respective gates are regarded as independent. Therefore, since correlation between signals may be perfectly neglected, COP is the worst in respect of precision among the above mentioned methods, but it can be executed by the shortest execution time.

DWAA as a second method is that COP may be applied while logical values of respective nodes on which correlation between signals occurs are fixed to 0 or 1. The primary effect of correlation between signals has been taken into consideration. This method has been reviewed in S. Ercolani, M. Favalli, M. Damiani, P. Olivo, B. Ricco, entitled "Estimate of Signal Probability in Combinational Logic Networks", European Test Conference, pp. 132–138, 1989 (this paper will be referred to as "EFDOR" hereinafter), which can result in higher precision than that of COP.

CCM as a third method has been reviewed for the first time in the EFDOR which is the same paper as DWAA, and has been established in R. Marculescu, D. Marculescu, M. Pedram, entitled "Switching Activity Analysis Considering Spatiotemporal Correlations", International Conference on CAD-94, pp. 294–299, 1994 (this paper will be referred to as "MMP" hereinafter), which can achieve highest precision in the foregoing methods. This method represents a degree of signal correlation between nodes by virtue of quantity of correlation coefficient, and calculation may be executed by approximating a correlation coefficient among three nodes or more by a product of correlation coefficients between two nodes. CCM is superior in an aspect of precision to COP and DWAA, but the fault of CCM is that it needs long execution time. However, since the precision is good but not sufficient yet, the MMP paper has proposed that the precision can be improved by combining CCM with BDD by virtue of circuit partition. But at that time complexity of calculation is considerably enhanced, and the case may be supposed wherein the method effected based on simulation can attain excellent efficiency rather than such combined method. For this reason, there is a possibility that advantages of the method effected based on the probability calculation may be lost totally.

In the method effected based on probability, dependency of the precision on input data is remarkable and in addition no consideration as for delay time has been taken. However, since temporally separate signals can be regarded as independent signals (F. N. Najm, entitled "Improved Estimation of the Switching Activity for Reliability Prediction in VLSL Circuits", Custom Integrated Circuits Conference, pp. 429–432, 1994), there are some cases where correlation between the signals having a large difference in delay time can be neglected. But in this paper no particular time interval permitting signal correlation to be neglected has been proposed.

In the meanwhile, not only average power but also instantaneous power must be known in order to analyze actual operation of the LSI. For example, instantaneous power or instantaneous current is required to analyze the problem of noise due to variation in power-supply voltage. However, although there has been time-consuming techniques using simulation, no particular calculation method for instantaneous power without simulation has been developed yet. In literatures such as Najm et al., entitled "Probabilistic Simulation for Reliability Analysis of CMOS VLSI Circuits", IEEE Trans. CAD 9 (4), pp. 439–450, April 1990, and R. Burch, entitled "Pattern-Independent Current Estimation for Reliability Analysis of CMOS Circuits", pp. 294–299, 25th DA Conference, 1988, calculation has been executed based on the conception of probability waveform. But in actual LSI design procedures, changes in current and instantaneous power must be known in advance in response to concrete input patterns, e.g., program for a CPU, input data for a signal processing LSI, etc. Especially, if noise in a power-supply system, etc. being further considered, short-time behavior of the power-supply system should be understood. All techniques proposed in the prior art are insufficient for these purposes.

With the above discussions, the calculation method based on simulation can improve the precision if plenty of test vectors are input, but it needs a lot of execution time. On the other hand, although the calculation method based on probability calculation can be carried out in a relatively short time, it is inferior in precision to other methods. Therefore, the method has the problem that to specify errors is difficult since the precision of the method depends upon respective input data.

SUMMARY OF THE INVENTION

The present invention has been made to overcome the above problems, and an object of the present invention is to provide a method of estimating power required for an integrated circuit capable of executing power estimation effectively with high precision and in a short time.

In order to achieve this and other objects, according to an aspect of the present invention, there is provided a method of estimating power required for an integrated circuit including a logic circuit constituted by connecting a plurality of logic gates, including the steps of calculating probability quantity accompanying to output nodes of respective logic gates, the probability quantity being represented by probability that logical values of the output nodes of respective logic gates are 1 (referred to as "signal probability" hereinafter) and probability that logical values of the output nodes of respective logic gates are changed (referred to as "switching probability" hereinafter), expanding into series a difference $P_e - P_a$ between a strict value $P_e$ of the probability quantity and a value $P_a$ calculated based on supposition that all inputs of respective logic gates are independent, with respect to the probability quantity corresponding to entire input signals of the integrated circuit, and estimating power required for the integrated circuit by first calculating infinite number of terms in the series as a correction term and then employing a value obtained by adding the correction term to said value $P_a$ as an approximate value of the probability quantity.

According to another aspect of the present invention, there is provided a method of estimating power required for an integrated circuit including a logic circuit constituted by connecting a plurality of logic gates, comprising the steps of partitioning the logic circuit into logical module sets consisting of a plurality of logic gates, representing logical values of respective nodes belonging to respective logical modules as a logical function of input signals of the logical modules, and then calculating probability quantity accompanying to nodes of respective logical modules and being represented by signal probability and switching probability, expanding into series a difference $P_e - P_a$ between a strict value $P_e$ of the probability quantity and a value $P_a$ calculated based on supposition that all inputs of respective logical modules are independent, with respect to said probability quantity corresponding to entire input signals of the integrated circuit, and estimating power required for the integrated circuit by first calculating infinite number of terms in the series as a correction term and then employing a value obtained by adding the correction term to the value $P_a$ as an approximate value of the probability quantity.

In the method of estimating power required for an integrated circuit, it is preferable that the step of estimating power required for the integrated circuit is carried out by employing a value, which may be obtained by multiplying switching probability of arbitrary nodes in the logic circuit by driving capacity of the arbitrary nodes, square of power-supply voltage and a clock frequency, as power consumption in the nodes because of their charging/discharging.

In the method of estimating power required for an integrated circuit, it is also preferable that the step of estimating power required for the integrated circuit is performed by employing a value, which may be obtained by multiplying probability that arbitrary input transition patterns are generated in arbitrary gates of the logic circuit by power consumption of every transition if the arbitrary input transition patterns are generated, as average power consumption in the gates because of their input transition.

According to still another aspect of the present invention, there is provided a method of estimating power required for an integrated circuit by calculating operation probability of the integrated circuit, comprising the steps of determining a minimum difference in delay time between a plurality of signals acting as input signals to gates in the integrated circuit, classifying gate inputs into groups according to determined minimum difference in delay time, and calculating probability with considering correlation between respective groups of classified gate inputs, and then calculating probability concerning gate outputs by virtue of probability concerning the gate inputs probability which have been calculated.

According to yet still another aspect of the present invention, there is provided a method of estimating power required for an integrated circuit by calculating operation probability of the integrated circuit, comprising the steps of assuming Markov nature on probability of an identical signal if more than two nodes depend on the identical signal, and disregarding correlation of signals between theses nodes within specified maximum allowable error if a minimum difference in delay time is sufficiently large until the identical signal reaches these nodes.

According to further aspect of the present invention, there is provided a method of estimating power required for an integrated circuit by calculating operation probability of the integrated circuit, comprising the step of disregarding correlation of an identical signal X between more than two nodes within specified maximum allowable error if these nodes depend on the identical signal X and in addition if probability concerning logical values of the identical signal X may satisfy the condition $P(\overline{X})P(X) \leq Error$, where Error is specified maximum allowable error, $P(\overline{X})$ is probability the identical signal X is a logical value 0, and $P(X)$ is probability the identical signal X is a logical value 1.

According to still further aspect of the present invention, there is provided a method of estimating power consumption in an integrated circuit by estimating the power consumption, comprising the steps of partitioning input pattern set being provided to primary input terminals in time series with a time interval, calculating statistics and probability characteristic of pattern provided to the primary input terminals every time interval, calculating power consumption every time interval based on the statistics and probability characteristic, and arranging power consumption in every time interval in a time series fashion.

According to yet still further aspect of the present invention, there is provided a method of estimating power required for an integrated circuit by providing statistics and probability quantity to input terminals of logic circuits so as to estimate propagation of the probability quantity, comprising the steps of inputting descriptions of circuit structure or circuit operation of the integrated circuit before executing power estimation by virtue of input signals or input signal characteristics provided to objective circuits, storing them into a storing unit after converting them into evaluation equation or data structure required for power estimation, and utilizing the evaluation equation or data structure plural times upon estimating power.

According to additional aspect of the present invention, there is provided a method of estimating power required for an integrated circuit, comprising the steps of classifying partial circuits of the integrated circuit acting as a unit of estimation into respective attentional circuit systems, and outputting consumed power and power-supply current to desired partial circuit sets.

In the present invention, by correcting the probability quantity calculated based on assumption that all inputs of respective logic gates are independent, calculation of the signal probability and the switching probability may be carried out with respect to respective nodes of combinational logic circuits with high precision and at high speed. Moreover, the precision can be enhanced by virtue of circuit partition and BDD techniques.

In turn, in the present invention, by disregarding signal correlation within the maximum allowable error specified while considering delay time difference and input probability values, a calculation amount of operating probability of the logic circuit can be reduced.

In addition, in the present invention, power which being momentarily changing in the logic circuit can be known without long time calculation by circuit simulator and logical simulator. In contrast to the conventional simulator scheme, time required for power estimation can be saved significantly. Further, change of power can be examined with a desired precision by adjusting a degree of definition in a time interval. Furthermore, calculation efficiency can be improved since the process to be calculated repeatedly every time interval can be implemented at one time. It is feasible for the designer to estimate power consumption in the arbitrary partial circuits and compare them with each other.

BRIEF DESCRIPTION OF THE DRAWINGS

The aforementioned and other features and objects of the present invention and the manner of attaining them will become more apparent and the invention itself will be best understood by reference to the following description of preferred embodiments taken in conjunction with the accompanying drawings, wherein:

FIGS. 11A and 11B are tables respectively showing switching probability caused in respective gate outputs, in which FIG. 11A is a table having four time intervals and FIG. 11B is a table having two time intervals;

DETAILED DESCRIPTION OF PREFERRED EMBODIMENTS

Figure 1:
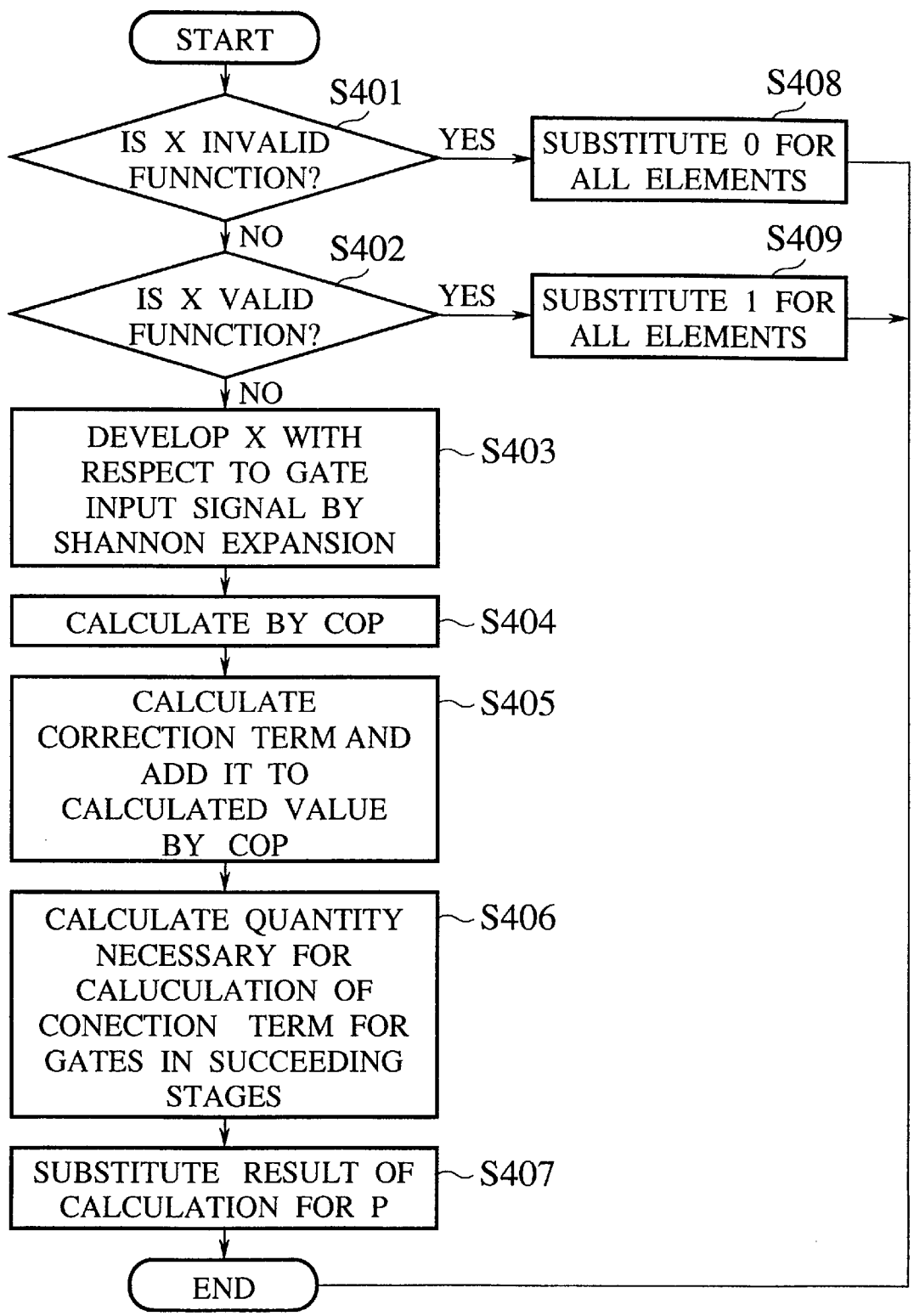
FIG. 1 is a flowchart illustrating process procedures according to a first embodiment of the present invention.

There will now be described the power estimation method for an integrated circuit according to preferred embodiments of the present invention with reference to the accompanying drawings hereinafter.

First Embodiment

A first embodiment of the present invention will be explained hereinbelow. Various definitions needed for understanding the present invention will be explained first prior to explanation of the first embodiment. In the first embodiment the present invention may be applied to the signal probability, and in a second embodiment the present invention may be applied to the switching probability. In a third embodiment, a power consumption estimation method for nodes and gates using the methods of the first embodiment and the second embodiment will be discussed, and in a fourth embodiment an example of logic circuit optimization using the power consumption estimation method will be discussed.

A logic circuit used herein signifies a combinational logic circuit excluding a sequential circuit. Assume that the number of primary inputs of the logic circuit is n and the primary inputs are denoted as $x_1, \ldots, x_n$. Logical values of the primary inputs $x_i$ ($i=1, \ldots, n$) at time t are expressed as $x_i(t)$. In some cases, they are also expressed as $x_i$ regardless of denpendency upon time. Therefore, the symbol $x_i$ is used to express both the name and the logical value of the primary inputs, but there is no confusion since distinction between them is not important in most cases. In general, although arbitrary nodes of the logic circuit are logical function of the primary inputs $x_1, \ldots, x_n$, the above may be true of respective nodes similarly. In other words, the symbol Z for the node Z has both meanings of the name of the node Z and the logical value thereof irrespective of time. In the event that the logical function is used without special notice, it signifies the logical function of the primary inputs $x_1, \ldots, x_n$ hereinafter.

Three assumptions for the logic circuit and the primary inputs are the following.

(1) Time translation invariance of probability
(2) Mutual independence between primary inputs
(3) Delay time 0

The assumption (1) means that an equation (4) can be written at arbitrary time t, $t_{ij}$ ($j=1, \ldots, n_i$; $i=1, \ldots, n$) and $\alpha_{ij}=0, 1$ ($j=1, \ldots, n_i$; $i=1, \ldots, n$).

$$P\left(\prod_{i=1}^{n}\prod_{j=1}^{n_i} X_1^{\alpha ij}(t_{ij})\right) = P\left(\prod_{i=1}^{n}\prod_{j=1}^{n_i} X_i^{\alpha ij}(t_{ij}+t)\right) \quad (4)$$

Where the primary inputs $x_i$ ($i=1, \ldots, n$) are defined by $$X_i^0 \stackrel{\text{def}}{=} \overline{X_i} \text{ and } X_i^1 \stackrel{\text{def}}{=} X_i.$$

Here $\overline{x_i}$ denotes a logical NOT of $x_i$. Probability that X has the logical value 1 for the arbitrary logical function X is expressed by P(X), which is called as the probability with respect to the logical function X. It can be seen that, according to this assumption, the probability P(X(t)) with respect to the arbitrary logical function X(t) which depends upon particular one time alone does not depend upon time. Therefore, P(X(t)) may be written by P(X). It can also be seen that the probability with respect to the logical function which depends upon two times or more depends upon a difference between times alone.

The assumption (2) means that an equation (5) can be written at arbitrary time t, $t_{ij}$ ($j=1, \ldots, n_i$; $i=1, \ldots, n$) and $\alpha_{ij}=0, 1$ ($j=1, \ldots, n_i$; $i=1, \ldots, n$).

$$P\left(\prod_{i=1}^{n}\prod_{j=1}^{n_i} X_1^{\alpha ij}(t_{ij})\right) = \prod_{i=1}^{n} P\left(\prod_{j=1}^{n} X_i^{\alpha ij}(t_{ij})\right) \quad (5)$$

But an independence of the same primary input with respect to time has not been assumed, and thus $P(x_1(t_1)x_1(t_2))$ is in general different from $P(x_1(t_1)x_1(t_2))$ at times $t_1$, $t_2$, for example.

The assumption (3) means that the logical values of the internal nodes in the logic circuit at certain time may be defined by the logical values of the primary inputs at that time. In other words, the logical value of the arbitrary node Z in the circuit at time t depends upon one time alone, and may be written like Z(t). Thus the probability as for the arbitrary node Z at time t may be written like P(Z), which is called as the signal probability of the node Z.

If the arbitrary logical function X(t) depending upon one time alone, like the nodes in the circuit, is expressed in the product-sum form, an equation (6) is given.

$$X(t) = \sum_{\alpha 1=0}^{1} \ldots \sum_{\alpha n=0}^{1} x_1^{\alpha 1}(t) \ldots x_n^{\alpha n}(t) X_{1 \ldots \alpha}^{\alpha 1 \ldots \alpha n} \quad (6)$$

Where a coeffient $X_{1 \ldots n}^{\alpha 1 \ldots \alpha n}$ does not depend upon time t, and it assumes the logical value of 0 or 1 identically. An equation (39) and a theorem described below will be often referred to in the following sentences.

[Theorem 0.1]

If X(t), Y(t) are arbitrary logical functions of the primary inputs depending upon one time alone, an equation (7) may be satisfied for arbitrary times $t_1$, $t_2$.

$$P(X(t_1)Y(t_2))=P(X(t_2)Y(t_1)) \quad (7)$$

(Proof)

If X, Y are represented by virtue of the equation (39) after being developed into the form of product-sum, this theorem results in proving of an equation (8) for arbitrary i ($i=1, \ldots, n$).

$$P(\overline{x_i(t_1)}x_i(t_2))=P(\overline{x_i(t_2)}x_i(t_1)) \quad (8)$$

Then, if employing that equations (9) (10) are satisfied and $P(x_i(t))$ does not depend upon time t, $$\overline{x_i(t_1)}x_i(t_2)+x_i(t_1)x_1(t_2)=x_i(t_2) \qquad (9)$$

$$\overline{x_i(t_2)}x_i(t_1)+x_i(t_2)x_i(t_1)=x_i(t_1) \qquad (10)$$

it can be understood that an equation (11) can be satisfied.

$$\begin{aligned}P(x_i) &= P(\overline{x_i(t_1)}x_i(t_2)) + P(x_i(t_1)x_i(t_2)) \\ &= P(\overline{x_i(t_2)}x_i(t_1)) + P(x_i(t_2)x_i(t_1))\end{aligned} \qquad (11)$$

Therefore, an equation (12) may be concluded.

$$P(\overline{x_i(t_1)}x_1(t_2)) = P(\overline{x_{i1}(t_2)}x_i(t_1)) \qquad (12)$$

(Proof End)

If $x_i$ is an arbitrary primary input and X is arbitrary logical function, we can write $$X = \overline{x_i}X_i^0 + x_i X_i^1 \qquad (13)$$

where $X_1^0(X_i^1)$ represents a logical function wherein $x_i = 0$ ($x_i = 1$) at X. In other words, $$X_i^0 \stackrel{def}{=} X|_{xi=0}, X_i^1 \stackrel{def}{=} X|_{xi=1}. \qquad (14)$$

The equation (46) is called as Shannon expansion as to the primary input $x_i$. $X_i^\alpha$ ($\alpha = 0, 1$) is called as a cofactor of Shannon expansion as to $x_1$ of X. Note that superscripts 0, 1 for X does not mean logical negation and logical affirmation. For the primary input $x_i$, for example, $x_1^0$ signifies logical negation $\overline{x_i}$, but $X_i^0$ does not signify $\overline{Xi}$. Although it would be confusing to used the same symbols like the above, in this event there are few cases where confusion may be caused between them since a quantity of $X_i$ has not been defined yet. It is rarely the case that we may waver in our judgement of the meaning of this symbol in the following sentences.

Next, a definition of the switching probability and a relationship between the switching probability and the transition density will be explained.

$\tau$ is a time interval wherein switching occurs only once at most. At this time, $P(Z(t+\tau)\overline{Z(t)})$ denotes probability that the logical value of the node Z changes from o to 1 during time t to time t+$\tau$. According to the foregoing assumption (1), $P(Z(t+\tau)\overline{Z(t)})$ does not depend upon time t but $\tau$ alone and is equal to $P(Z(\tau)\overline{Z(0)})$. Similarly, $P(\overline{Z(t+\tau)}Z(t))$ denotes probability that the logical value of the node Z changes from 1 to 0 during time t to time t+$\tau$. This is equal to $P(\overline{Z(\tau)}Z(0))$. Switching probability $P_{sw}(Z;\tau)$ of the node Z during time interval $\tau$ may be defined as changing probability of the logical value. Therefore, we obtain $$P_{sw}(Z;\tau) \stackrel{def}{=} P(Z(\tau)\overline{Z(0)}) + P(\overline{Z(\tau)}Z(0)). \qquad (15)$$

The equation (15) can be written in virtue of an identical equation (16) derived from the assumption (1)

$$\begin{aligned}P(Z) &= P(Z(\tau)Z(0)) + P(Z(\tau)\overline{Z(0)}) \\ &= P(Z(\tau)Z(0)) + P(\overline{Z(\tau)}Z(0))\end{aligned} \qquad (16)$$

as $$P_{sw}(Z;\tau) = 2P(Z(\tau)\overline{Z(0)}). \qquad (17)$$

The switching probability is an average value of the switching times caused during time interval $\tau$, and it has the following relation for the transition density.

$$D(Z) = \lim_{\tau \to 0} \frac{P_{sw}(Z;\tau)}{\tau} \qquad (18)$$

In the foregoing descriptions, although the switching probability has been mentioned particularly since the CMOS logic circuit is supposed tacitly as the logic circuit, power consumption can be estimated in terms of the signal probability in the dynamic circuit and the ratio type circuit.

Subsequently, calculation method of signal probability according to the present invention (to be called as "BAM" hereinafter) will be explained.

(1) First the case will be explained at first where Z is an output node of a two-input AND gate. If input nodes of the gate are A and B, obviously a relationship $$Z = AB \qquad (19)$$

will be satisfied. By applying the equation (6) to nodes A and B, $$\begin{aligned}P(Z) &= P(AB) \\ &= \sum_{\alpha 1=0}^{1} \ldots \sum_{\alpha n=0}^{1} \sum_{\beta 1=0}^{1} \ldots \sum_{\beta n=0}^{1} P(x_1^{\alpha 1} x_1^{\beta 1}) \\ & \quad \ldots P(x_n^{\alpha n} x_n^{\beta n}) A_1^{\alpha 1 \ldots \alpha n} B_1^{\beta 1 \ldots \beta n}\end{aligned} \qquad (20)$$

is formed. The equation (20) is a strict expression representing the signal probability of output of the two-input AND gate, and therefore it is difficult to calculate directly that, as discussed earlier. Hence, an approximation is required in place of strict calculation. The simplest approximation method is COP which may regard entire input of the logic gate as independent ones, but, as can be seen from experiments, approximation by means of COP is not so good in respect of precision. Consequently, another approximation method capabling of achieving still higher precision is needed. For this reason, differences between strict signal probability P(AB) and approximate probability P(A)P(B) in virtue of COP will be examined. If A, B is expressed in the form of product-sum like the equation (6), a product of P(A), P(B) is given as $$P(A)P(B) = \qquad (21)$$
$$\sum_{\alpha 1=0}^{1} \ldots \sum_{\alpha n=0}^{1} \sum_{\beta n=0}^{1} \ldots \sum_{\beta n=0}^{1} P(x_1^{\alpha 1})P(x_1^{\beta 1}) \ldots$$
$$P(x_n^{\alpha n})P(x_n^{\beta n}) A_1^{\alpha 1 \ldots \alpha n} B_1^{\beta 1 \ldots \beta n}.$$

Where, by defining $$\chi_1^{\alpha \beta} \stackrel{def}{=} P(x_1^\alpha x_1^\beta), \eta_1^{\alpha \beta} \stackrel{def}{=} P(x_1^\alpha)P(x_1^\beta) \qquad (22)$$

and defining the function F in virtue of symbolic variable as $$F = F(\xi) \stackrel{def}{=} \qquad (23)$$
$$\sum_{\alpha 1=0}^{1} \ldots \sum_{\alpha n=0}^{1} \sum_{\beta 1=0}^{1} \ldots \sum_{\beta n=0}^{1} \xi_1^{\alpha 1 \beta 1} \ldots$$
$$\xi_n^{\alpha n \beta n} A_1^{\alpha 1 \ldots \alpha n} B_1^{\beta 1 \ldots \beta n}$$

a following equation (24) is derived.

$$P(AB) = F(\chi), P(A)P(B) = F(\eta) \qquad (24)$$

Accordingly, a difference between P(AB) and P(A)P(B) can be expressed as $$P(AB) - P(A)P(B) = F(\chi) - F(\eta). \quad (25)$$

If we develop this equation in terms of Taylor expansion and then employ the first order term, $$P(AB) - P(A)P(A) = \sum_{i=0}^{n} \sum_{\alpha=0}^{1} \sum_{\beta=0}^{1} (\chi_1^{\alpha\beta} - \eta_1^{\alpha\beta}) \frac{\partial F}{\partial \eta_1^{\alpha\beta}} (\eta) \quad (26)$$

can be derived. To represent the right side of this equation by simpler equation, if we develop A, B in the right side of $F(\eta)=P(A)P(B)$ by Shannon expansion with respect to $x_i$, $$\begin{aligned}
F(\eta) &= P(A)P(B) \quad (27)\\
&= \sum_{\alpha=0}^{1} \sum_{\beta=0}^{1} P(x_1^{\alpha})P(x_1^{\beta})P(A_1^{\alpha})P(B_1^{\beta})\\
&= \sum_{\alpha=0}^{1} \sum_{\beta=0}^{1} \eta_1^{\alpha\beta} P(A_1^{\alpha})P(B_1^{\beta})
\end{aligned}$$

can be obtained. Therefore, it can be seen that $$\frac{\partial F}{\partial \eta_1^{\alpha\beta}} (\eta) = P(A_1^{\alpha})P(B_1^{\beta}). \quad (28)$$

Where $A_1^{\alpha}$ is a cofactor of Shannon expansion $$A = \overline{x_i}A_i^0 + x_i A_i^1 \quad (29)$$

with respect to $x_i$ of A. The above is true of B similarly. In addition, since $$\begin{aligned}
\chi_1^{\alpha\beta} - \eta_1^{\alpha\beta} &= P(x_1^{\alpha} x_1^{\beta}) - P(x_1^{\alpha})P(x_1^{\beta}) \quad (30)\\
&= \delta^{\alpha\beta} P(x_1^{\alpha}) - P(x_1^{\alpha})P(x_1^{\beta})\\
&= (-1)^{\alpha+\beta} P(x_1)P(\overline{x_1}),
\end{aligned}$$

the equation (25) is derived as follows.

$$P(Z) = P(A)P(B) + \sum_{i=1}^{n} P(x_1)P(\overline{x_1}) \times \quad (31)$$

$$(P(A_1^0) - P(A_1^1))(P(B_1^0) - P(B_1^1))$$

According to this equation (31), it would be understood that $2n+1$ numerical values such as $P(A)$, $P(A_1^{\alpha})$, $P(B)$, $P(B_i^{\alpha})$ ($i=1, \ldots, n$; $\alpha=0, 1$) may be given with respect to the gate inputs A, B to calculate approximate value of $P(Z)$. Because there is a case where the output node Z also acts as an input of other gates, $P(Z_i^{\alpha})$ as well as $P(Z)$ has to be calculated. Since $$\begin{aligned}
Z &= AB \quad (32)\\
&= (\overline{x_1}A_1^0 + x_1 A_1^1)(\overline{x_1}B_1^0 + x_1 B_1^1)\\
&= \overline{x_1}A_1^0 B_1^0 + x_1 A_1^1 B_1^1,
\end{aligned}$$

$$Z_1^{\alpha} = A_1^{\alpha} B_1^{\alpha} \quad (a=0, 1), \quad (33)$$

whence $$P(Z_i^{\alpha}) = P(A_i^{\alpha} B_i^{\alpha}) \quad (a=0, 1). \quad (34)$$

Like the calculation of $P(Z)$, the equation (34) may be calculated by virtue of Taylor expansion. However, in this event, for example, the first order term of Taylor expansion is $P(A_{ij}^{\alpha\beta})$ with respect to A, but information concerning them are not given to the node A (only two kinds of numerical values $P(A)$, $P(A_i^{\alpha})$ are given to A). Therefore, a zero order term of Taylor expansion is employed, and $P(Z_i^{\alpha})$ can be given by virtue of $$P(Z_i^{\alpha}) = P(A_i^{\alpha})P(B_i^{\alpha}) \quad (i=1, \ldots, n; \alpha=0, 1). \quad (35)$$

Equations (31) (35) are fundamental formulae for the two-input AND gate.

Then the right sides of equations (31) and (35) will be written respectively as $P(A)*P(B)$, $P(A_i^{\alpha})*P(B_1^{\alpha})$ and so on hereinafter. In other words, $$P(A)*P(B) = P(A)P(B) + \quad (36)$$

$$\sum_{i=1}^{n} P(x_1)P(\overline{x_1})(P(A_1^0) - P(A_1^1))(P(B_1^0) - P(B_1^1)),$$

and $$P(A_i^{\alpha})*P(B_i^{\alpha}) = P(A_i^{\alpha})P(B_i^{\alpha}) \ (i=1, \ldots, n; \alpha=0, 1). \quad (37)$$

As discussed above, it is a feature of BAM that the signal probability calculated by COP can be corrected sequentially by providing the signal probability ($P(A)$) and the probability ($P(A_i^{\alpha})$) for the cofactor of Shannon expansion concerning to respective primary inputs to respective nodes.

(2) Difference points between BAM and COP are to execute calculation of the equation (35) and presence of the second term on the right side of the equation (31). Since the first term on the right side of the equation (31) is none other than that being calculated by applying COP to the attentional logic gate, the second term on the right side of the equation (31) may be regarded as a correction term therefor. Here only the meaning of the correction term is given. If the meaning of this correction term is considered in brief, it would be defined as a correction to bury differences of operation rules between a Boolean algebra and a real number field. To explain this, simple examples may be provided.

Figure 2:
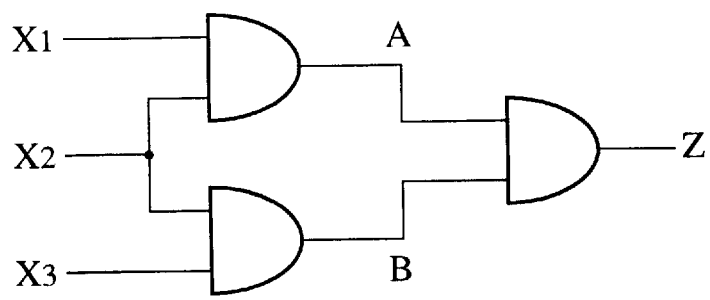
FIG. 2 is a circuit diagram illustrating an example of a simple logic circuit having correlation between signals.

Since in the logic circuit in FIG. 2, $$A = x_1 x_2, \ B = x_2 x_3 \quad (38)$$

is satisfied, strict signal probability $P_{ext}(Z)$ for Z is $$\begin{aligned}
P_{ext}(Z) &= P(AB) \quad (39)\\
&= P((x_1 x_2)(x_2 x_3))\\
&= P(x_1)P(x_2)P(x_3).
\end{aligned}$$

On the other hand, approximate value $P_{COP}(Z)$ derived by COP is $$\begin{aligned}
P_{cop}(Z) &= P(A)P(B) \quad (40)\\
&= (P(x_1)P(x_2))(P(x_2)P(x_3))\\
&= P(x_1)P(x_2)^2 P(x_3).
\end{aligned}$$

Differences between $P_{ext}(Z)$ and $P_{COP}(Z)$ reside in the relation in terms of Boolean algebra, $$x_2 x_2 = x_2 \quad (41)$$

and the relation in terms of the real number field, $$P(x_2)P(x_2) = P(x_2)^2. \quad (42)$$

Since in this case the correction term of COP according to BAM is $P(x_2)P(\overline{x_2})P(x_1)P(x_3)$, approximate value $P_{bam}(Z)$ of the signal probability of Z by virtue of BAM is $$\begin{aligned}
P_{bam}(Z) &= P_{cop}(Z) + P(x_2)P(\overline{x_2})P(x_1)P(x_3) \quad (43)\\
&= P(x_1)P(x_2)^2 P(x_3) + P(x_2)P(\overline{x_2})P(x_1)P(x_3)\\
&= P(x_1)P(x_2)P(x_3),
\end{aligned}$$

which coincides with the strict value $P_{ext}(Z)$. If this correction term is rewritten, $$P(x_2)P(\overline{x_2})P(x_1)P(x_3) = (P(x_2) - P(X_2)^2)P(x_1)P(x_3) \quad (44)$$

can be obtained, and a difference between operation of the Boolean algebra and operation of the real number concerning to aforementioned $x_2$ may appear therein. In other words, this correction term may fulfill a role so as to pull back $P(x_2)^2$ appearing in $P_{COP}(Z)$ into $P(x_2)$ in $P_{ext}(Z)$.

Although correction based on BAM may give strict values in the above discussed logic circuits, it cannot always give such strict values in ordinary logic circuits. For example, in case the term of $P(x_1)^2 P(x_2)^2$ appears in the signal probability calculated by COP, $P(x1)^2$ and $P(x_2)^2$ must be simultaneously pulled back to $P(x_1)$, $P(x_2)$ respectively to obtain the strict signal probability by correcting COP. However, this pull-back operation would be implemented only once for respective primary inputs in the BAM. That is, the correction term by virtue of BAM in this case results in $$P(x_1)P(\overline{x_1})P(x_2)^2 + P(X_2)P(\overline{X_2})P(x_1)^2, \qquad (45)$$

which is in general different than $$P(x_1)P(x_2) - P(x_1)^2 P(X_2)^2. \qquad (46)$$

If this pull-back operation should also be done, further higher order terms of Taylor expansion must be considered in the equation (26). However, as can be easily seen, in case up to k-th order term of Taylor expansion may be employed, a calculation time in the order of $n^k G$ (G is the number of gates) may be required for calculation of the signal probability. If the number n of the primary inputs becomes greater, a calculation time may be increased exponentially even in case k=2, for example. Accordingly, the calculation time in the case where above described k=1 is appropriate as the real calculation time.

(3) Next, the case where Z is the output node of the inverter will be explained. If an input node of the inverter is denoted as A, there is a relation of $$Z = \overline{A}, \qquad (47)$$

therefore $$P(Z) = 1 - P(A) \qquad (48)$$

can be obtained. In addition, since $$Z = \overline{A} = \overline{x_i A_i^0} + x_i \overline{A_u^1} \ (i=1, \ldots, n), \qquad (49)$$

$$Z_1^\alpha = \overline{A_i^\alpha} \ (i=1, \ldots, n; \alpha=0, 1) \qquad (50)$$

thus $$P(Z_i^\alpha) = 1 - P(A_i^\alpha) \ (i=1, \ldots, n; \alpha=0, 1) \qquad (51)$$

can be attained.

Since all logic circuits can be developed by the two-input AND gates and inverters, calculation by virtue of BAM can be applied to an arbitrary logic circuit by equations (31) (35) (48) and (51).

(4) Error accompanying to BAM may be estimated now. The equation (31) includes an error such as about square of $\chi_i^{\alpha\beta} - \eta_i^{\alpha\beta}$ since the second term of Taylor expansion has been disregarded in the equation (26). Where $\chi_i^{\alpha\beta}$, $\eta_i^{\alpha\beta}$ is defined by the equation (22). As has already been discussed, since $$\chi_i^{\alpha\beta} - \eta_i^{\alpha\beta} = (-1)^{\alpha+\beta} P(x_i) P(\overline{x_i}), \qquad (52)$$

if it may be considered that $P(x_i)$ can have only a value between 0 and 1, $$|\chi_i^{\alpha\beta} - \eta_i^{\alpha\beta}| \leq 0.25. \qquad (53)$$

Where an equal sign is satisfied when $P(x_i)=0.5$. Therefore, error included in the equation (31) is about $0.25^2 = 0.0625$. Similarly, an error in the equation (35) is about 0.25. However, this is the case where the signal probability $P(A)P(B)$ of the inputs A, B and probability $P(A_i^\alpha)$, $P(B_i^\alpha)$ ($i=1, \ldots, n; \alpha=0, 1$) for the cofactor have their strict values. In general, because A, B act as the output nodes of other logic gates, their signal probabilities and the probability for the cofactor includes error. The fact will now be proved that error in an arbitrary node is 0.0625 for the signal probability and 0.25 for the cofactor.

This may be proved by proving that, on the assumption that an input node of the arbitrary node has such error, an output node thereof includes similar error (inductive method). In the case that the attentional logic gate is an inverter, since it is obvious that the magnitudes of errors of the input and the output are identical, it may be proved as the two-input AND gate. According to the assumption, error in the first term on the right side of the equation (31) is about 0.0625. Because in the second term on the right side the probability for the cofactor of A, B having error of about 0.25 has been multiplied by the number of about 0.25 of $P(x_i)P(\overline{x_i})$, the second term on the right side as a whole includes error of about $0.25 \times 0.25 = 0.0625$. For this reason, $P(Z)$ includes error of about 0.0625. While it is obvious that the equation (35) has error of about 0.25. With the above, it can be seen that the signal probability of the output node Z of the two-input AND gate includes error of about 0.0625, and the probability for the cofactor includes error of about 0.25. Accordingly, by the inductive method, it has been proved that the signal probability of all output nodes includes error of about 0.0625, and the probability for the cofactor includes error of about 0.25.

It should be noted that this proof is an estimation of an error level and that there are some cases where actual error may be in excess of the above predicted error because of cumulative error.

(5) The case has been discussed above where Z is the two-input AND gate and the inverter. Now to apply BAM to general logic gates will be explained.

Assume that Zs are output nodes of the general logic gates, which are not limited to the two-input AND gate and the inverter, and that inputs of the gates are $A_1, \ldots, A_m$. At this time, Zs are the logical function of $A_1, \ldots, A_m$ as well as the logical function of the primary inputs via $A_a$ (a=1, ..., m). This means $$\begin{aligned} Z &= Z(A_1, \ldots, A_m) \\ &= Z(A_1(x_1, \ldots, x_n), \ldots, A_m(x_1, \ldots, x_n)) \end{aligned} \qquad (54)$$

if written by function sign. If expressed in the form of product-sum of the gate input, Zs are given as $$Z = \sum_{\alpha 1=0}^{1} \ldots \sum_{\alpha m=0}^{1} A_1^{\alpha 1} \ldots A_m^{\alpha m} Z_{1 \ldots m}^{\alpha m}. \qquad (55)$$

Therefore, $$P(Z) = \sum_{\alpha 1=0}^{1} \ldots \sum_{\alpha m=0}^{1} P(A_1^{\alpha 1} \ldots A_m^{\alpha m}) Z_{1 \ldots m}^{\alpha 1 \ldots \alpha m} \qquad (56)$$

may be satisfied. Because there are cases where signal correlation appears between $A_1, \ldots, A_m$, in general $$P(A_1^{\alpha 1} \ldots A_m^{\alpha m}) \neq P(A_1^{\alpha 1}) \ldots P(A_m^{\alpha m}) \qquad (57)$$

is given. By substituting $A_1^{\alpha 1}$ into A of the equation (31) and $A_2^{\alpha 2} \ldots A_m^{\alpha m}$ into B so as to apply BAM, $$P(A_1^{\alpha 1} \ldots A_m^{\alpha m}) \cong P(A_1^{\alpha 1}) * P(A_2^{\alpha 2} \ldots A_m^{\alpha m}) \qquad (58)$$

is derived. By repeating this calculation, $$P(A_1^{\alpha 1} \ldots A_m^{\alpha m}) \approx P(A_1^{\alpha 1}) * P(A_2^{\alpha 2}) * (\ldots \\ *(P(A_{m-1}^{\alpha m-1}) * P(A_m^{\alpha m})) \ldots)) \quad (59)$$

is derived. Since an operation '*' does not satisfy an associative law, this equation depends upon numbering of $A_a$ (a=1, ..., m). However, difference due to the numbering may be disregarded temporarily since this will be discussed later. In order to actually execute the foregoing calculation, Shannon expansion may be employed as follows. If one of gate inputs upon which Zs depend is $A_a$, Shannon expansion may be executed like $$Z = \overline{A_a} Z_a^0 + A_a Z_a^1. \quad (60)$$

Where $Z_a^\mu$ ($\mu = 0, 1$) is the cofactor of Shannon expansion concerning $A_a$. Care must be taken that this should not be confused with the cofactor of Shannon expansion concerning to the primary inputs of Z. For the cofactors of Shannon expansion concerning to the gate inputs, $\mu, \nu, \ldots$ are used as superscripts while a, b, ... are used as subscripts to avoid such confusion. On the other hand, for the cofactors of Shannon expansion concerning to the primary inputs, $\alpha$, $\beta$, ... are used as superscripts while i, j, ... are used as subscripts, like the above. The equation (60) may be written as $$P(Z) = \sum_{\mu=0}^{1} P(A_d^\mu Z_d^\mu), \quad (61)$$

where superscripts concerning the gate input Aa signify $$A_a^1 \stackrel{\text{def}}{=} A_a, A_a^1 \stackrel{\text{def}}{=} \overline{A_a}.$$

Also care must be taken not to confuse them since the symbols which have been defined for the primary inputs are diverted to the gate inputs. Then if the right side of the equation (61) being approximated by virtue of BAM, $$P(Z) \approx \sum_{\mu=0}^{1} P(A_d^\mu) * P(Z_d^\mu) \quad (62)$$

is derived. This equation may be written in detail by replacing X=Z in an equation (63) in the following lemma.

[Lemma 0.1]

If X is the logical function of logical functions $A_1, \ldots, A_m$, an approximate equation for arbitrary a=1, ..., m by virtue of BAM is given by $$P(X) \approx \sum_{\mu=0}^{1} P(A_d^\mu) P(X_d^\mu) + \sum_{i=1}^{n} \sum_{\mu=0}^{1} \sum_{\alpha=0}^{1} G_{a,i}^{\mu\alpha} P((X_d^\mu)_i^\alpha) \quad (63)$$

$$P((X)_i^\alpha) \approx \sum_{\mu=0}^{1} P((A_d^\mu)_i^\alpha) P((X_d^\mu)_i^\alpha) \quad (64)$$

$(i = 1, \ldots, n; \alpha = 0, 1),$ where $G_{a,i}^{\mu\alpha}$ is defined by $$G_{a,i}^{\mu\alpha} \stackrel{\text{def}}{=} P(x_i^\alpha) \sum_{\beta=0}^{1} (\delta^{\alpha\beta} - P(x_i^\beta)) P((A_d^\mu)_i^\beta) \quad (65)$$

$(i = 1, \ldots, n; \mu = 0, 1)$ and, for an arbitrary logical function Y, $(Y)_i^\alpha$ is the cofactor of Shannon expansion concerning of $x_i^\alpha$ of Y.

(Proof) Since the equation (63) has already been discussed in the foregoing, the equation (30) will be proved. $(X)_i^\alpha$ is defined by Shannon expansion $$X = \sum_{\alpha=0}^{1} x_i^\alpha (X)_i^\alpha. \quad (66)$$

After X is developed by virtue of Shannon expansion with respect to $A_a$, if this equation is compared with $$\begin{aligned} X &= \sum_{\alpha=0}^{1} A_d^\mu X_d^\mu \quad (67) \\ &= \sum_{\mu=0}^{1} \sum_{\alpha=0}^{1} \sum_{\beta=0}^{1} x_i^\alpha (A_d^\mu)_i^\alpha x_i^\beta (X_d^\mu)_i^\beta \\ &= \sum_{\alpha=0}^{1} x_i^\alpha \left( \sum_{\mu=0}^{1} (A_d^\mu)_i^\alpha x (X_d^\mu)_i^\beta \right), \end{aligned}$$

then $$(X)_i = \sum_{\mu=0}^{1} (A_d^\mu)_i^\alpha (X_d^\mu)_i^\alpha \quad (68)$$

can be derived. Therefore, $$P((X)_i^\alpha) = \sum_{\mu=0}^{1} P((A_d^\mu)_i^\alpha (X_d^\mu)_i^\alpha), \quad (69)$$

but here an approximation $$P((A_a^\mu)_i^\alpha (X_a^\mu)_i^\alpha) \approx P((A_a^\mu)_i^\alpha P((X_a^\mu)_i^\alpha) \quad (70)$$

may be executed in terms of BAM.

By employing this lemma recurrently, the signal probability P(Z) of the node Z and the probability $P((Z)_i^\alpha)$ of the cofactor can be calculated.

$G_{a,1}^{\mu\alpha}$ defined in the lemma 0.1 may satisfy the following nature.

[Lemma 0.2]

$$\sum_{\alpha=0}^{1} G_{a,i}^{\mu\alpha} = 0 \ (\mu = 0, 1) \quad (71)$$

$$\sum_{\mu=0}^{1} G_{a,i}^{\mu\alpha} = 0 \ (\alpha = 0, 1) \quad (72)$$

(Proof) The first equation is obvious from the definition of $G_{a,1}^{\alpha\beta}$.

In order to prove the second equation, it should be used that, based on $$(\overline{A_a})_i^\alpha = \overline{(A_a)_i^\alpha} (\alpha = 0, 1), \quad (73)$$

$$P((\overline{A_a})_i^\alpha) + P((\overline{(A_a)_i^\alpha})) = 1 \quad (74)$$

may be satisfied.

According to this lemma, we can write the equation (63) as $$P(X) \approx \sum_{\mu=0}^{1} P(A_d^\mu) P(X_d^\mu) + \quad (75)$$

$$\sum_{i=1}^{1} P(x_i) P(\overline{x_i}) (P((A_a)_i^1) - P((A_a)_i^0)) \times$$

$$\{P((X_a^o)_i^0) - P((X_a)_i^1) - P((X_a)_i^0) + P((X_a)_i^1)\}.$$

(6) Here breakdown of the associative law of '*' will be estimated. For this purpose, P(A)*(P(B)*P)C)(P(A)*P(B)) *P(C) would be examined. Since $$P(A)*(P(B)*P(C)) = P(A)(P(B)*P(C)) + \qquad (76)$$

$$\sum_{i=1}^{n} P(x_i)P(\overline{x_i})(P(A_i^0) - P(A_i^1))(P(B_i^0)*P(C_i^0) - P(B_i^1)*P(C_i^1))$$

$$= P(A)\{P(B)P(C)) + \sum_{i=1}^{n} P(x_i)P(\overline{x_i}) \times$$

$$(P(B_i^0) - P(B_i^1))P(C_i^0) - P(C_i^1))\} +$$

$$\sum_{i=1}^{n} P(x_i)P(\overline{x_i})(P((A_i^0) - P((A_i^1)) \times (P(B_i^0)P(C_i^0) - P(B_i^1)P(C_i^1)),$$

$$P(A)*(P(B)*P(C)) - (P(A)*P(B))*P(C) = \qquad (77)$$

$$\sum_{i=1}^{n} P(x_i)P(\overline{x_i})(P(B_i^0) - P(B_i^1)) \times$$

$$\{\delta_i(A)(P(C_i^0) - P(C_i^1)) - \delta_i(C)(P(A_i^0) - P(A_i^1))\}$$

can be concluded after some calculation. Where $\delta_i(A)$, $\delta_i(C)$ are respectively errors in Shannon expansion with respect to A, C. For instance, with respect to A, $$\delta_i(A) \stackrel{def}{=} P(A) - \{P(x_i)P(A_i^0) + P(x_i)P(A_i^1)\} \qquad (78)$$

is defined. The same may be applied with respect to C. If $\delta_i(A)$, $\delta_i(C)$ are small, the associative law may be satisfied approximately.

(7) Algorithm BAM_SIGNAL( ) for calculating the signal probability at the arbitrary node in the circuit according to the foregoing method (BAM) will be explained hereinafter.

At first, all logic gates in the logic circuit are stacked on the stack STACK_G preliminarily. At this event, it should be assumed that the logic gate which has as its output the input node of the arbitrary logic gate G must be always stacked over G in the STACK_G.

```
procedure BAM_SIGNAL( ):
begin
    while STACK_G IS NOT EMPTY do
    SET OUTPUT OF G TO Z, AND LET Z REPRESENT AS
LOGIC FUNCTION OF INPUT OF G;
    PREPARE ARRANGEMENT P HAVING SIZE 2N+1;
    BAMs(Z,P);
    SUBSTITUTE VALUE OF P FOR P(Z), P((Z)_i^α)(I=1, . . . ,N;
α = 0,1);
    end
Where the algorithm BAMs ( ) is given below.
    procedure BAMS (X, P):
    begin
        if X IS INVALID FUNCTION then
            SUBSTITUTE 0 FOR ALL ELEMENT VALUES OF P;
            return;
        if X IS VALID FUNCTION then
            SUBSTITUTE 1 FOR ALL ELEMENT VALUES OF P;
            return;
        SET ONE OF GATE INPUTS UPON WHICH X DEPENDS
TO AA;
        SUBSTITUTE P(X), P((X)_i^α)(I=1, . . . , N; α =0,1)
CALCULATED BY EQUATIONS (63)(64) FOR P;
        comment READ BAMS( ) RECURRENTLY AT THIS TIME;
        return
    end
```

From the above algorithm, it can be seen that calculation can be executed if a logical relation between inputs and outputs of the logic gates are given. Hence, an improvement in calculation precision may be expected by partitioning the circuit into a set of several logic gates (referred to as "logical module" hereinafter). This is because signal correlations in the logical modules have already been taken into consideration by providing the logical relations between inputs and outputs of the logical modules. Like this, when the logic circuits are divided into virtual logical modules, the above algorithm may be changed shown in the following.

The third line of BAM_SIGNAL( ) should be changed into "SET OUTPUT OF G TO Z, AND LET Z REPRESENT AS LOGICAL FUNCTION OF INPUT OF LOGICAL MODULE TO WHICH G BELONGS;". In addition, the fifth line of BAMs( ) should be changed into "SET ONE OF GATE INPUTS UPON WHICH X DEPENDS TO AA;".

FIG. 1 is a flowchart illustrating process procedures in BAMs (X, P).

(8) Here, for purposes of example, the case will be explained where COP, CCM, BAM are applied to the circuit shown in FIG. 2.

Assume that values of the signal probability of 0.1, 0.3, 0.9 are supplied respectively to the primary inputs $x_1$, $x_2$, $x_3$ of the circuit in FIG. 2. In this event, according to strict calculation, the signal probability $P(Z)$ of the output node Z is 0.027. If being calculated by virtue of COP, $P(Z)$ is given as $P(Z)=0.0081$, which results in a large error in contrast to the strict value. Conversely, calculation based on CCM and BAM may give the strict value.

Second Embodiment

In the second embodiment, a method of calculating the switching probability employing the first invention will be explained.

(1) First the case will be explained where Z is an output node of the two-input AND gate. $P(Z(\tau)\overline{Z(0)})$ may be obtained to calculate the switching probability. Since $$P(Z(\tau)\overline{Z(0)})=P(Z)-P(Z(\tau)Z(0)) \qquad (79)$$

is given in the event that $P(Z)$ has been calculated, $P(Z(\tau)Z(0))$ may be calculated. If input nodes of the gate are A, B, a relation $$Z=AB \qquad (80)$$

is given, therefore a calculation amount $P(Z(\tau)Z(0))$ may be represented by $$P(Z(\tau)Z(0))=P(A(\tau)A(0)B(\tau)B(0)). \qquad (81)$$

Using the equation (6), $$P(Z(\tau)Z(0)) = P(A(\tau)A(0)B(\tau)B(0)) = \tag{82}$$

$$\sum_{\alpha 1=0}^{1} \ldots \sum_{\alpha n=0}^{1} \sum_{\alpha\cdot 1=0}^{1} \ldots \sum_{\alpha\cdot n=0}^{1} \sum_{\beta 1=0}^{1} \ldots \sum_{\beta n=0}^{1} \sum_{\beta\cdot 1=0}^{1} \ldots$$

$$\sum_{\beta\cdot n=0}^{1} P(x_1^{\alpha 1}(\tau) x_1^{\alpha\cdot 1}(0) x_1^{\beta 1}(\tau) x_1^{\beta\cdot 1}(0)) \ldots$$

$$P(x_n^{\alpha n}(\tau) x_n^{\alpha\cdot n}(0) x_n^{\beta n}(\tau) x_n^{\beta\cdot n}(0)) \times$$

$$A_1^{\alpha 1 \ldots \alpha n} A_1^{\alpha\cdot 1 \ldots \alpha\cdot n} B_1^{\beta 1 \ldots \beta n} B_1^{\beta\cdot 1 \ldots \beta\cdot n}$$

may be derived. Like the case of the signal probability, by examining a difference between the calculation value based on the equation (82) and the calculation value by virtue of COP $$P(A(\tau)A(0))P(B(\tau)B(0)) = \tag{83}$$

$$\sum_{\alpha 1=0}^{1} \ldots \sum_{\alpha n=0}^{1} \sum_{\alpha\cdot 1=0}^{1} \ldots \sum_{\alpha\cdot n=0}^{1} \sum_{\beta 1=0}^{1} \ldots \sum_{\beta n=0}^{1} \sum_{\beta\cdot 1=0}^{1} \ldots$$

$$\sum_{\beta\cdot n=0}^{1} P(x_1^{\alpha 1}(\tau) x_1^{\alpha\cdot 1}(0)) P(x_1^{\beta 1}(\tau) x_1^{\beta\cdot 1}(0)) \ldots$$

$$P(x_n^{\alpha n}(\tau) x_n^{\alpha\cdot n}(0)) P(x_n^{\beta n}(\tau) x_n^{\beta\cdot n}(0)) \times$$

$$A_1^{\alpha 1 \ldots \alpha n} A_1^{\alpha\cdot 1 \ldots \alpha\cdot n} B_1^{\beta 1 \ldots \beta n} B_1^{\beta\cdot 1 \ldots \beta\cdot n},$$

the correction term may be calculated by virtue of BAM. For this purpose, if $$\chi_i^{\alpha\alpha\cdot\beta\beta\cdot} \stackrel{def}{=} P(x_i^\alpha(\tau) x_i^{\alpha\cdot}(0) x_i^\beta(\tau) x_i^{\beta\cdot}(0)) \tag{84}$$

$$\eta_i^{\alpha\alpha\cdot\beta\beta\cdot} \stackrel{def}{=} P(x_i^\alpha(\tau) x_i^{\alpha\cdot}(0)) P(x_i^\beta(\tau) x_i^{\beta\cdot}(0))$$

is set and if the function F $$F = F(\xi) \stackrel{def}{=} \tag{85}$$

$$\sum_{\alpha 1=0}^{1} \ldots \sum_{\alpha n=0}^{1} \sum_{\alpha\cdot 1=0}^{1} \ldots \sum_{\alpha\cdot n=0}^{1} \sum_{\beta 1=0}^{1} \ldots \sum_{\beta n=0}^{1} \sum_{\beta\cdot 1=0}^{1} \ldots$$

$$\sum_{\beta\cdot n=0}^{1} \xi_1^{\alpha 1\alpha\cdot 1\beta 1\beta\cdot 1} \ldots$$

$$\xi_n^{\alpha n\alpha\cdot n\beta n\beta\cdot n} A_1^{\alpha 1 \ldots \alpha n} A_1^{\alpha\cdot 1 \ldots \alpha\cdot n} B_1^{\beta 1 \ldots \beta n} B_1^{\beta\cdot 1 \ldots \beta\cdot n},$$

may be defined by a symbolic variable $\xi_i^{\alpha\alpha\cdot\beta\beta\cdot}$, $$P(A(\tau)A(0)B(\tau)B(0)) = F(\chi),$$

$$P(A(\tau)A(0))P(B(\tau)B(0)) = F(\eta) \tag{86}$$

may be obtained. As a result, a difference between $P(A(\tau)A(0)B(\tau)B(0))$ and $P(A(\tau)A(0))P(B(\tau)B(0))$ may be represented by $$P(A(\tau)A(0)B(\tau)B(0)) - P(A(\tau)A(0))P(B(\tau)B(0)) = F(\chi) - F(\eta). \tag{87}$$

If this equation is developed by virtue of Taylor expansion, and then the first order term may be employed, $$P(A(\tau)A(0)B(\tau)B(0)) - P(A(\tau)A(0))P(B(\tau)B(0)) \simeq \tag{88}$$

$$\sum_{i=1}^{n} \sum_{\alpha=0}^{1} \sum_{\alpha*=0}^{1} \sum_{\beta=0}^{1} \sum_{\beta*=0}^{1} (\chi_i^{\alpha\alpha*\beta\beta*} - \eta_i^{\alpha\alpha*\beta\beta*}) \frac{\partial F}{\partial \eta_i^{\alpha\alpha*\beta\beta*}}(\eta)$$

is obtained. By substituting $$\chi_i^{\alpha\alpha*\beta\beta*} - \eta_i^{\alpha\alpha*\beta\beta*} = P(x_i^\alpha(\tau) x_i^{\alpha*}(0) x_i^\beta(\tau) x_i^{\beta*}(0)) - \tag{89}$$

$$P(x_i^\alpha(\tau) x_i^{\alpha*}(0)) P(x_i^\beta(\tau) x_i^{\beta*}(0))$$

$$= \delta^{\alpha\beta} \delta^{\alpha*\beta*} P(x_i^\alpha(\tau) x_i^{\alpha*}(0)) -$$

$$P(x_i^\alpha(\tau) x_i^{\alpha*}(0)) P(x_i^\beta(\tau) x_i^{\beta*}(0))$$

and $$\frac{\partial F}{\partial \eta_i^{\alpha\alpha*\beta\beta*}}(\eta) = P((A(\tau))_i^\alpha (A(0))_i^{\alpha*}) P(B(\tau))_i^\beta (B(0))_i^{\beta*}) \tag{90}$$

for the equation (88), $$P(A(\tau)A(0)B(\tau)B(0)) - P(A(\tau)A(0))P(B(\tau)B(0)) \simeq \tag{91}$$

$$\sum_{i=1}^{n} \sum_{\alpha=0}^{1} \sum_{\alpha*=0}^{1} \sum_{\beta=0}^{1} \sum_{\beta*=0}^{1} P(x_i^\alpha(r) x_i^{\alpha*}(0)) (\delta^{\alpha\beta}\delta^{\alpha*\beta*} - P(x_i^\beta(r) x_i^{\beta*}(0)) \times$$

$$P(A(\tau))_i^\alpha (A(0))_i^{\alpha*}) P((B(\tau))_i^\beta (B(0))_i^{\beta*})$$

is obtained. If the equation (91) is further transformed with taking the theorem 0.1 into consideration, $$P(A(\tau)A(0)B(\tau)B(0)) - P(A(\tau)A(0))P(B(\tau)B(0)) \simeq \tag{92}$$

$$\sum_{i=1}^{n} \{2 p_i^{00} p_i^{01} (A_i^{00} - A_i^{01})(B_i^{00} - B_i^{01}) + p_i^{00} p_i^{11} (A_i^{00} - A_i^{01})(B_i^{00} - B_i^{11}) +$$

$$2 p_i^{01} p_i^{11} (A_i^{01} - A_i^{01})(B_i^{01} - B_i^{11})\}$$

is achieved. Where $$p_i^{\alpha\beta} \stackrel{def}{=} P(x_i^\alpha(\tau) x_i^\beta(0)) \quad (\alpha, \beta = 0, 1) \tag{93}$$

and $$A_i^{\alpha\beta} \stackrel{def}{=} P((A(\tau))_i^\alpha (A(0))_i^\beta), \tag{94}$$

$$B_i^{\alpha\beta} \stackrel{def}{=} P((B(\tau))_i^\alpha (B(0))_i^\beta), \quad (\alpha, \beta = 0, 1)$$

are defined. With the above, $$P(Z(\tau)Z(0)) \simeq P(A(\tau)A(0)P(B(\tau)B(0)) + \tag{95}$$

$$\sum_{i=1}^{n} \{2 p_i^{00} p_i^{01} (A_i^{00} - A_i^{01})(B_i^{00} - B_i^{01}) +$$

$$p_i^{00} p_i^{11} (A_i^{00} - A_i^{01})(B_i^{00} - B_i^{11}) + 2 p_i^{01} p_i^{11} (A_i^{01} - A_i^{11})(B_i^{01} - B_i^{11})\}$$

may be attained. Since there is possibility that Z serves as inputs of other gates, an amount of $P((Z(\tau))_i^\alpha (Z(0))_i^\beta)$ relating to the cofactor of Shannon expansion must be calculated in addition to the above calculated $P(Z(\tau)Z(0))$. According to the same consideration as the signal probability, $P((Z(\tau))_i^\alpha (Z(0))_i^\beta)$ may be approximated by $$P((Z(\tau))_i^\alpha (Z(0))_i^\beta) \simeq \qquad (96)$$

$$P((A(\tau))_i^\alpha (A(0))_i^\beta) P((B(\tau))_i^\alpha (B(0))_i^\beta) \quad (\alpha, \beta = 0, 1).$$

The equations (95) (96) are fundamental formulae with respect to the switching probability.

As in the case of the signal probability, the right sides of the equations (95) (96) may be written by the sign '*' respectively as $P(A(\tau)A(0))*P(B(\tau)B(0))$ and $P((A(\tau))_i^\alpha(A(0))_i^\beta*P((B(\tau))_i^\alpha(B(0))_i^\beta)$.

(2) Next, the case will be considered where Z is an output node of the inverter. Since Z and an input node A have the relation $$Z = \overline{A}, \qquad (97)$$

it can be seen that $$P(Z(\tau)\overline{Z(0)}) = P(A(\tau)\overline{A(0)}) \qquad (98)$$

is obtained based on the theorem 0.1. It can also be seen that $$P(Z(\tau))_i^\alpha \overline{Z(0)})_i^\beta = P(A_i^\beta) - P(A_i^\alpha) + P((A(\tau))_i^\alpha (\overline{A(0)})_i^\beta) \quad (\alpha, \beta = 0, 1) \qquad (99)$$

is obtained via the simple calculation.

(3) The cases have been considered where Z is an output node of the two-input AND gate or an output node of the inverter. Here the case will be explained where general logic gates are used.

Assume that Zs are output nodes of the general logic gates, which are not limited to the two-input AND gate and the inverter, and that inputs of the logic gates are $A_1, \ldots, A_m$. At this time, Zs are the logical function of $A_1, \ldots, A_m$ as well as the logical function of the primary inputs via $A_a$ (a=1, ..., m). This means $$\begin{aligned} Z &= Z(A_1, \ldots, A_m) \\ &= Z(A_1(x_1, \ldots, x_n), \ldots, A_m(x_1, \ldots, x_n)) \end{aligned} \qquad (100)$$

if it is written by the function sign. If being expressed in the form of product-sum of the gate input, Zs are given as $$Z = \sum_{\alpha 1=0}^{1} \ldots \sum_{\alpha m=0}^{1} A_1^{\alpha 1} \ldots A_m^{\alpha m} Z_{1 \ldots m}^{\alpha 1 \ldots \alpha m}. \qquad (101)$$

Therefore, $$P(Z(\tau)\overline{Z(0)}) = \qquad (102)$$

$$\sum_{\mu 1=0}^{1} \ldots \sum_{\mu m=0}^{1} \sum_{\mu \cdot 1=0}^{1} \ldots \sum_{\mu \cdot m=0}^{1} P(A_1^{\mu 1}(\tau) A_1^{\mu \cdot 1}(0) \ldots A_m^{\mu m}(\tau) A_m^{\mu \cdot m}(0) \times Z_{1 \ldots m}^{\mu 1 \ldots \mu m} \overline{Z_{1 \ldots m}^{\mu \cdot 1 \ldots \mu \cdot m}}$$

may be satisfied. Like the case of the signal probability, recurrent calculation method of calculating $P(Z(\gamma)\overline{Z(0)})$ will be shown to achieve $$P(A_1^{\mu 1}(\tau) A_1^{\mu \cdot 1}(0) \ldots A_m^{\mu m}(\tau) A_m^{\mu \cdot m}(0) \simeq \qquad (103)$$

$$P(A_1^{\mu 1}(\tau) A_1^{\mu \cdot 1}(0))*( \ldots *(P(A_{m-1}^{\mu m-1}(\tau) A_{m-1}^{\mu \cdot m-1}(0))*$$

$$(P(A_m^{\mu m}(\tau) A_m^{\mu \cdot m}(0))) \ldots ).$$

For this reason, the following lemma is utilized.

[Lemma 0.3]

If X, Y are the logical function of $A_1, \ldots, A_m$, approximate equations for arbitrary a=1, ..., m by virtue of BAM are given by $$P(X(\tau)Y(0)) \simeq \sum_{\mu=0}^{1} \sum_{\nu=0}^{1} P(A_a^\mu(\tau) A_a^\nu(0)) P(X_a^\mu(\tau) Y_a^\nu(0)) + \qquad (104)$$

$$\sum_{i=1}^{n} \sum_{\mu=0}^{1} \sum_{\nu=0}^{1} \sum_{\alpha=0}^{1} \sum_{\beta=0}^{1} G_{a \cdot 1}^{\mu \alpha \nu \beta} P((X_a^\mu(\tau))_i^\alpha (Y_a^\nu(0))_i^\beta),$$

and $$P((X(\tau))_i^\alpha Y(0))_i^\beta) \simeq \qquad (105)$$

$$\sum_{\mu=0}^{1} \sum_{\nu=0}^{1} P(A_a^\mu(\tau))_i^\alpha (A_a^\nu(0))_i^\beta) P(X_a^\mu(\tau))_i^\alpha (Y_a^\nu(0))_i^\beta).$$

$(i = 1, \ldots, n; \alpha, \beta = 0, 1)$

Where $$G_{a \cdot 1}^{\mu \alpha \nu \beta} \stackrel{def}{=} P \Bigg( (X_i^\alpha(\tau) x_i^\beta(0)) \sum_{\alpha^*=0}^{1} \sum_{\beta^*=0}^{1} \times \qquad (106)$$

$$(\delta^{\alpha \alpha^*} \delta^{\beta \beta^*} - P((x_i^{\alpha^*}(\tau) x_i^{\beta^*}(0))) \times P((A_a^\mu(\tau))_i^{\alpha^*}(A_a^\nu(0))_i^{\beta^*} \Bigg)$$

$(i = 1, \ldots, n; \mu, \nu, \alpha, \beta = 0, 1)$ is defined.

(Proof) Since the proof is the same as that in the lemma 0.1, it is omitted. (Proof End)

Like the case of the signal probability, $P(Z(\tau)Z(0))$, $P((Z(\tau))_i^\alpha(Z(0))_i^\beta)$ can be calculated by using this lemma recurrently.

$G_{a,1}^{\mu \alpha \nu \beta}$ defined in the lemma 0.3 satisfy the following nature.

[Lemma 0.4]

$$\sum_{\alpha=0}^{1} \sum_{\beta=0}^{1} G_{a \cdot 1}^{\mu \alpha \nu \beta} = 0, \sum_{\mu=0}^{1} \sum_{\nu=0}^{1} G_{a \cdot 1}^{\mu \alpha \nu \beta} = 0 \qquad (107)$$

$$\sum_{\mu=0}^{1} G_{a \cdot 1}^{\mu \alpha \nu \beta} = \frac{P(x_i^\alpha(\tau) x_i^\beta(0))}{P(x_i^\beta)} G_{a \cdot 1}^{\nu \beta} \qquad (108)$$

$$\sum_{\nu=0}^{1} G_{a \cdot 1}^{\mu \alpha \nu \beta} = \frac{P(x_i^\alpha(\tau) x_i^\beta(0))}{P(x_i^\alpha)} G_{a \cdot 1}^{\mu \alpha}$$

$$G_{a \cdot 1}^{\mu \alpha \nu \beta} = G_{a \cdot 1}^{\nu \beta \mu \alpha} \qquad (109)$$

(Proof) The first equation in the first line can easily proved. Proof of the second equation in the first line may be achieved by combining the lemma 0.2 with the equation in the second line. The equation in the second line may be proved similarly to the proof of the second equation in the lemma 0.2. The equation in the third line is obvious from the theorem 0.1.

(Proof End)

(4) Algorithm BAM_SIGNAL( ) for calculating the switching probability according to BAM will be explained hereinafter. The switching probability of the node Z may be given by substituting Z for X and substituting $\overline{Z}$ for Y in the following algorithm.

--- procedure BAMt (X, Y, P):
begin
    if X OR Y IS INVALID FUNCTION then
        SUBSTITUTE 0 FOR ALL ELEMENT VALUES OF P;
        return;
    if X IS VALID FUNCTION then
        BAMs (Y, P);
        return;

-continued

```
if Y IS VALID FUNCTION then
    BAMs (X, P);
    return;
SET ONE OF INPUTS OF LOGICAL MODULES UPON
WHICH X DEPENDS TO AA;
    SUBSTITUTE VALUES CALCULATED BY
EQUATIONS (70)(71) FOR P;
    comment READ BAMt( ) RECURRENTLY AT THIS TIME;
    return
end
```

Where P is an arrangement in which calculated values are stored. The logical module in the algorithm denotes either the logical gates themselves or the virtual logical module described in the embodiment 1.

(5) The experiment has been tried by virtue of the algorithms.

Benchmark data of ISCAS85 have been adopted as the circuits. The square root of mean square absolute error, Root Mean Square value, of the switching probability extracted from random simulation (items of error in Table 1) and CPU time (items of CPU time in Table 1) have been measured. The result of the experiment is as follows.

TABLE I

| Circuit | Error (RMS) | | | CP U Time (sec) | | | |
|---------|------|-------|-------|------|------|------|------|
|         | COP  | BAM   | CCM   | SIM  | COP  | BAM  | CCM  |
| C17     | 0.007 | 0.001 | 0.024 | 2.58 | 0.09 | 0.09 | 0.10 |
| C432    | 0.075 | 0.051 | 0.022 | 57.9 | 0.08 | 0.62 | 76   |
| C499    | 0.004 | 0.004 | 0.007 | 65.4 | 0.13 | 0.87 | 143  |
| C880    | 0.020 | 0.012 | 0.031 | 146  | 0.12 | 0.87 | 88   |
| C1355   | 0.056 | 0.037 | 0.005 | 199  | 0.18 | 1.66 | 91   |
| C1908   | 0.018 | 0.011 | 0.008 | 272  | 0.17 | 1.73 | 134  |
| C3540   | 0.055 | 0.039 | 0.043 | 803  | 0.23 | 3.85 | 908  |
| C6288   | 0.130 | 0.116 | 0.044 | 1618 | 0.33 | 6.60 | 1245 |

In this experiment, the number of test vectors flown in random simulation has been set to 100000, and the signal probability and the switching probability of all primary inputs have been set to 0.5. Where, for the circuit of C17, differences of COP and BAM have been derived from the strict calculation values. In this experiment, results of SIM, COP, and CCM have been stated for comparison's sake, but programs for SIM and COP have been prepared independently to try the experiment while results of CCM have been quoted from MMP. But conversion values obtained considering performance difference of the machine have been employed as CPU time. The following is the conclusion derived from this table.

First, in respect to error, BAM is in general better in precision rather than COP and has higher reliability than COP. On the contrary, CCM is not always so, and very good precision has been achieved in some circuits while very poor precision has been obtained in other circuits. As a result, the precision has been changed circuit by circuit to be unstable. In other words, reliability becomes worse. In respect of CPU time, COP and BAM are significantly better than CCM. Hence it has been concluded that, if all respects are taken into account, BAM is superior to COP and CCM.

Subsequently, estimation error of power consumption in entire circuits will be explained.

On the assumption that wiring capacitances can be neglected and that gate input capacitance is constant, power consumption in the whole circuit is in proportion to the result obtained by multiplying the fanout number of respective nodes (gate number which is input from the node) by the switching probability of the node and then summing products of respective nodes. This is called as Normalized Power Dissipation Measure (NPDM). Errors between random simulation and NPDM in COP and BAM is in following Table II.

TABLE II

| Circuit | Error (%) | |
|---------|-------|-------|
|         | COP   | BAM   |
| C17     | 0.0   | 0.0   |
| C432    | -2.79 | -1.99 |
| C499    | 0.01  | 0.01  |
| C880    | -0.21 | 0.068 |
| C1355   | 2.73  | -0.32 |
| C1908   | -0.94 | 0.09  |
| C3540   | -0.96 | -1.30 |
| C6288   | 11.3  | 8.37  |

From this Table II, it can be concluded that estimation error of power consumption of all the circuits by virtue of BAM is within several %.

Third Embodiment

Next, since the switching probability can be calculated in terms of the methods discussed in the first and second embodiments, power consumption caused by charging/discharging in respective nodes may be detected according to the equations (1) (8). However the entire circuits are constituted with nodes and gates and power consumption accompanying transmission of gate inputs is caused even in the gates. Therefore, such power consumption would be considered.

A gate is G, and its input nodes are $A_1, \ldots, A_m$. In this event, average power consumption Pow(G) caused by the gate G may be expressed as follows.

$$Pow(G) = \lim_{\tau \to 0} \frac{1}{\tau} \sum_{\mu 1=0}^{1} \ldots \sum_{\mu m=0}^{1} \sum_{\upsilon 1=0}^{1} \ldots \quad (110)$$

$$\sum_{\mu m=0}^{1} P(A_1^{\mu 1}(\tau) A_1^{\upsilon 1}(0) \ldots A_m^{\mu m}(\tau) A_m^{\upsilon m}(0)) \times E_{\upsilon 1 \ldots \upsilon m}^{\mu 1 \ldots \mu m}(G)$$

Where $E_{\upsilon 1 \ldots \upsilon m}^{\mu 1 \ldots \mu m}(G)$ is consumption energy when inputs of G transmit from $A_1^{\upsilon 1}, \ldots, A_m^{\upsilon m}$ to $A_1^{\mu 1}, \ldots, A_m^{\mu m}$. In the case that these energy have been known entirely, Pow(G) may be calculated by the method discussed in the second embodiment.

Fourth Embodiment

In the fourth embodiment, a circuit optimization method will be explained wherein estimation values of power consumption estimated by the method discussed in the third embodiment are utilized.

Figure 3:
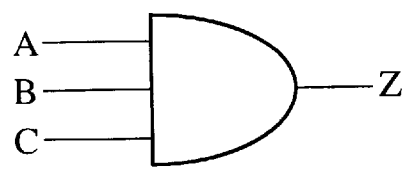
FIG. 3 is a circuit diagram illustrating a logic circuit consisting of a three-input AND gate.

Assume that necessity for developing the three-input AND gate into two two-input AND gates, as shown in FIG. 1, is caused in the layout stage of the three-input AND gate. Respective nodes A, B, C in FIG. 3 must be allocated to nodes a, b, c in FIG. 4. There are three ways (nodes a, b are assumed to be comparable) according to how to allocate nodes A, B, C in FIG. 3 to nodes a, b, c in FIG. 4. In this event, it should be assumed that allocation way permitting minimum power consumption has been requested.

As procedures, after all allocation ways have been tried, the way to achieve minimum power consumption is finally adopted.

Figure 4:
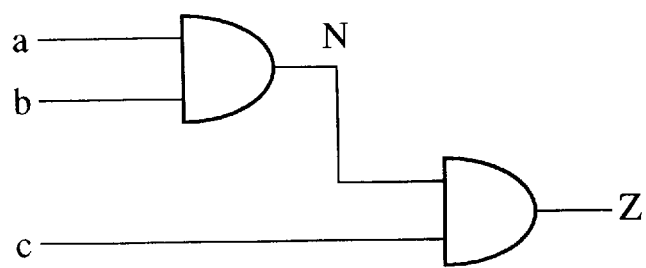
FIG. 4 is a circuit diagram illustrating a logic circuit in which a logic circuit in FIG. 6 is disassembled into two-input AND gates.

If driving capacitances of respective nodes in FIG. 4 are all comparable, consumption power in entire nodes is proportional to $$P_{sw}(a;\tau)+P_{sw}(b;\tau)+P_{sw}(c;\tau)+P_{sw}(N;\tau). \tag{111}$$

Since sum of the third term of this equation does not depend upon allocation, attention will be paid to the last term. Assume that respective nodes allocated to a, b are independent, then a relation $$P_{sw}(N;\tau)=P_{sw}(a;\tau)P(b)+P_{sw}(b;\tau)P(a)-\tfrac{1}{2}P_{sw}(a;\tau)P_{sw}(b;\tau) \tag{112}$$

is satisfied. Assume that for the nodes A, B, C in FIG. 3, $$P_{sw}=(A;\tau)=0.5$$
$$P_{sw}=(B;\tau)=0.3$$
$$P_{sw}=(C;\tau)=0.2, \tag{113}$$
$$P(A)=P(B)=P(C)=0.5 \tag{114}$$

and that the nodes A, B, C are independent, then $$P_{sw}=(N;\tau)=0.22 \tag{115}$$

is obtained if the node A is allocated to the node c, and $$P_{sw}=(N;\tau)=0.3 \tag{116}$$

is obtained if the node B is allocated to the node c, and $$P_{sw}=(N;\tau)=0.325 \tag{117}$$

is obtained if the node C is allocated to the node c. It can be found that power consumption is mostly lessened when the node A is allocated to the node c. Unless the nodes A, B, C are independent, more precise values realized by virtue of BAM have to be used.

As stated earlier, the present invention can be applied to logical synthesis to minimize power consumption.

Usually optimization may be subject to constraint such as timing, in addition to power consumption. In such case, to satisfy timing constraint must be prior to minimization of power consumption. In this event, after logical synthesis to meet timing constraint has been accomplished, optimization of power consumption may be effected.

Fifth Embodiment

A first embodiment of the second invention will be explained. For purposes of simplicity, calculation of the signal probability in the circuit excluding the sequential circuit (combinational circuit) will be considered.

Figure 6:
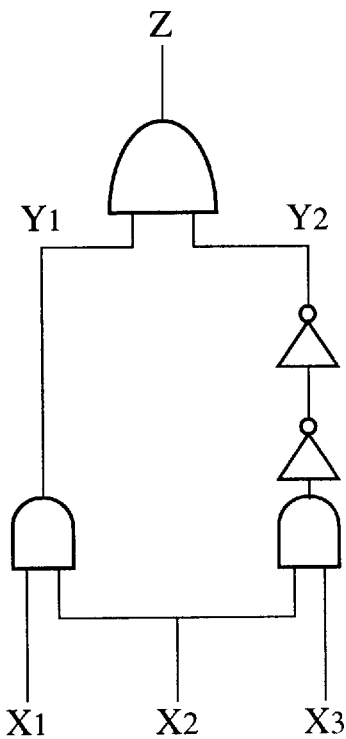
FIG. 6 is a circuit diagram illustrating an example of a simple circuit having correlation between signals.

In the circuit shown in FIG. 6, when the signal probability $P(X_i=1)$ (i=1, 2, 3) of independent primary inputs $X_i$ is given, the signal probability at the output Z will be calculated. Where P(A) is defined as the probability to meet the condition A. If delay time is neglected, obviously $$P(Z=1)=P(X_1=1)P(X_2=1)P(X_3=1) \tag{118}$$

is obtained. However, if respective gates have delay time of the magnitude 1, the probability that they have the signal value 1 at time=0 is $$P(Z=1, t=0) = P(X_1=1, t=-2) \times \tag{119}$$
$$P(X_2=1, t=-2; X_2=1, t=-4) \times P(X_3=1, t=-4),$$

where $P(A_1; A_2; \ldots ; A_n)$ is defined by the probability that all conditions $A_1, A_2, \ldots , A_n$ are satisfied. Furthermore, on the assumption that entire time is integral multiple of minimum time unit $\tau$, time may be represented by integral values. Accordingly, time i signifies true time i×$\tau$. If time correlation of the signal $X_2$ is very small and signals at time t=−2 and t=−4 can be regarded to be independent, $$P(X_2=1, t=-2; X_2=1, t=-4) \sim P(X_2=1, t=-2)P(X_2=1, t=-4) \tag{120}$$

is satisfied. In addition, suppose that the signal probability of the primary inputs is not dependent on time, $$P(Z=1)=P(X_1=1)P(X_2=1)^2P(X_3=1) \tag{121}$$

can be given. This is similar to the case where under the assumption $Y_1$, $Y_2$ are independent, $$\begin{aligned} P(Z=1) &= P(Y_1=1)P(Y_2=1) \\ &= P(X_1=1)P(X_2=1)) \times \\ &\quad (P(X_2=1)P(X_3=1)) \end{aligned} \tag{122}$$

is calculated. If delay is considered, then in the circuit diagram there is some cases where the signal with correlation can be calculated as the signal without correlation actually. This remarkably reduces time and labor required for calculation in the circuit having signal correlation.

In the foregoing example correlation is disregarded when a difference in delay time between $X_2$ and Z is 2. In this embodiment, the actual degree of difference in delay time will be examined which renders such disregard possible.

For this reason, following items are assumed.

(1) All primary inputs are mutually independent.
(2) Signal probability is not dependent on time.
(3) Signal probability of arbitrary primary input at certain time is dependent on signal value at immediately before time alone, not dependent on signal value prior to that time.
(4) Switching probability is not dependent on time.

The third assumption is called as Markov nature assumption, and the following is a representation by the equation.

$$P(X=x_n, t=n|X=X_{n-1}, t=n-1; \ldots ; X=x_o, t=0)=P(X=x_n, t=n|X=x_{n-1}, t=n-1), \tag{123}$$

where X is arbitrary primary input. P(A|B) is conditional probability that the condition A occurs under the condition B. The conditional probability satisfies the equation $$P(A|B)P(B)=P(A; B). \tag{124}$$

The conditional probability P(X=x, t−1|X=y, t=0) for the signal is defined as transition probability for the transition X=y→X=x. The fourth assumption indicates that $$P(X=x, t=i+1; X=y, t=i)=P(X=x, t=1; X=y, t=0) \tag{125}$$

is given at arbitrary time i. In the following, these assumptions are as a rule employed without notice or mentioning.

In general, if the probability concerning the gate output is represented by the probability concerning to the primary input by considering all routes from the output to the primary input, contribution in the form of $$P(X=x_1, t=i_1; X=x_2, t=i_2; \ldots ; X=X_n, t=i_n) \tag{126}$$

is given from respective primary inputs X. This is called as autocorrelation function of the signal X on the n point. Where $x_1, \ldots , x_n$ is the logical value of 0 or 1, and $i_1 \geq \ldots \geq i_n$ in indicates time which is represented by integral multiple of a minimal time unit $\tau$. It is feasible to calculate this strictly according to Markov nature.

By way of example, a calculation method of $P(X=x_n, t=n; X=x_o, t=0)$ is as follows.

Obviously, $$P(X = x_n, t = n; X = x_0, t = 0) = \quad (127)$$

$$\sum_{i=1}^{n-1} \sum_{xi=0}^{1} P(X = x_n, t = n; X = x_{n-1}, t = n-1, \ldots; X = x_0, t = 0)$$

is given. According to the assumption of Markov nature, we write $$P(X = x_n, t = n; X = x_{n-1}, t = n-1; X = x_0, t = 0) = \quad (128)$$

$$P(X = x_n, t = n | X = x_{n-1}, t = n-1; \ldots, X = x_0, t = 0) \times$$

$$P(X = x_{n-1}, t = n-1; \ldots, X = x_0, t = 0) =$$

$$P(X = x_n, t = n | X = x_{n-1}, t = n-1)$$

.
.
.

$$= P(X = x_n, t = n | X = x_{n-1}, t = n-1) \ldots P(X = x_1, t = 1 | X = x_0, t = 0) P(X = x_0)$$
$$= P(X = x_n, t = 1 | X = x_{n-1}, t = 0) \ldots P(X = x_1, t = 1 | X = x_0, t = 0) P(X = x_0).$$

To describe this equation simply, a 2×2 matrix Q is defined by $$Q_{ij} = P(X = i, t = 1 | X = j, t = 0) \quad (i, j = 0, 1). \quad (129)$$

Then we can write the equation (14) as $$P(X = x_n, t = n; X = x_0, t = 0) = [Q^n]_{x_n, x_0} P(X = x_0), \quad (130)$$

where $[Q^n]_{x_n, x_0}$ represents the $(x_n, x_0)$-th component of the matrix $Q^n$. Q is called as a transition matrix. If $Q^n$ has been calculated, then autocorrelation of the signal X can also be calculated. Thus Q is given by $$Q = \begin{pmatrix} 1 - \alpha_0 & \alpha_1 \\ \alpha_0 & 1 - \alpha_1 \end{pmatrix}, \quad (131)$$

where $$\alpha_o = P(X = 1, t = 1 | X = 0, t = 0)$$

$$\alpha_1 = P(X = 0, t = 1 | X = 1, t = 0). \quad (132)$$

Therefore, $$Q^n = \quad (133)$$

$$\begin{pmatrix} P(X=0) + P(X=1)(1-\alpha_0-\alpha_1)^n & P(x=0)(1-(1-\alpha_0-\alpha_1)^n) \\ P(X=1)(1-(1-\alpha_0-\alpha_1)^n) & P(X=1) + P(X=0)(1-\alpha_0-\alpha_1)^n \end{pmatrix}$$

results in. Where a relation $$|P(X = x_n, t = n; X = x_0, t = 0) - P(X = x_n) P(X = x_0)| \quad (134)$$

$$P(X = 0) = \frac{\alpha_1}{\alpha_0 + \alpha_1}, \quad P(X = 1) = \frac{\alpha_0}{\alpha_0 + \alpha_1}$$

is employed. Hence, $$P(X=0) P(X=1) |1-\alpha_o-\alpha_1|^n \quad (135)$$

is given. X at t=n and X at t=0 are independent when the right side of the equation (135) is 0. Therefore, the right side of the equation (135) may be regarded as error at that time. For example, in the case of request error of 10%, X at t=n and X at t=0 can be considered to be independent if there is delay time difference to satisfy $$n \geq \frac{\log 0.1 - \log P(X=0) P(X=1)}{\log |1 - \alpha_0 - \alpha_1|}. \quad (136)$$

Figure 7:
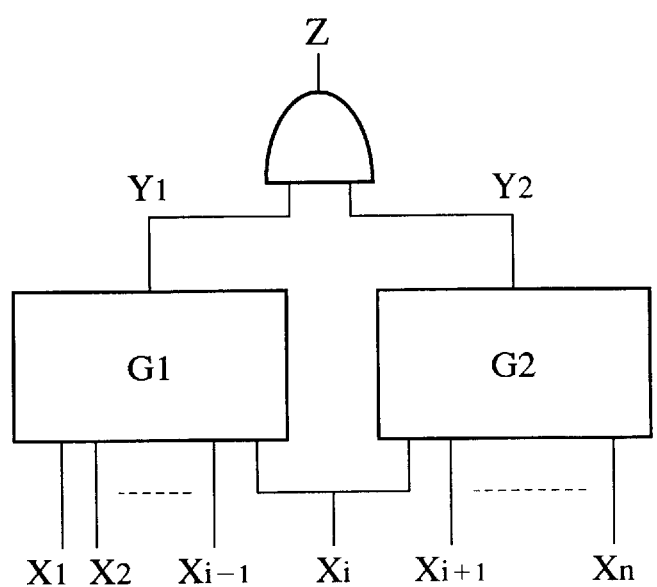
FIG. 7 is a circuit diagram illustrating an example of a circuit having correlation between signals.

Particularly, in the case of $|1-\alpha_o-\alpha_1|=0$, from the equation (134), X at t=n and X at t=0 can be considered to be independent with respect to arbitrary positive n in the strict meaning. In the case of $|1-\alpha_o-\alpha_1|=1$, it would be understood that, from the equation (135), X at t=n and X at t=0 can be regarded as independent only if P(X=0)P(X=1) is less than the request error. On the other hand, in case P(X=0)P(X=1) is less than request error ERROR, X at t=n and X at t=0 can be regarded as independent with respect to all n since $|1-\alpha_o-\alpha_1| \leq 1$. In particular in the case of n=0, X can be regarded as independent. This suggests that, if the signal probability of X satisfy the condition P(X=0)P(X=1) ≦ERROR, the signal X can be so calculated without consideration of the difference in delay time that it does not have signal correlation originally. For instance, in the circuit having the primary inputs such as $X_1, \ldots, X_n$ as shown in FIG. 7, $X_i$ may generate correlation in the gates having output Z via $Y_1, Y_2$. But when the condition $P(X_i=0)P(X_i=1)$<ERROR is satisfied, error is suppressed within ERROR if calculation is carried out by $$P(Z=1) = P(Y_1=1) P(Y_2=1). \quad (137)$$

This reason will be discussed in more detail.

In FIG. 7, if $Y_1, Y_2$ are represented as logical function of the primary inputs and then $X_i$ is developed by virtue of Shannon expansion, we may write $$Y_1 = X_i F_1 + \bar{X}_i F_o, \quad Y_2 = X_i G_1 + \bar{X}_i G_o \quad (138)$$

and $$Z = Y_1 Y_2 \quad (139)$$
$$= X_i X_i F_1 G_1 + X_i \bar{X}_i F_1 G_0 \bar{X}_i X_i F_0 G_1 + \bar{X}_i \bar{X}_i F_0 G_0$$
$$= X_i F_1 G_1 + \bar{X}_i F_0 G_0.$$

On the contrary, in case $Y_1, Y_2$ are regarded as independent, the signal probability of Z is given as $$\begin{aligned} P(Z=1) &= P(Y_1=1) P(Y_2=1) \\ &= P(X_i=1) P(X_i=1) P(F_1=1) P(G_1=1) + \\ &\quad P(X_i=1) P(X_i=0) P(F_1=1) P(G_0=1) + \\ &\quad P(X_i=0) P(X_i=1) P(F_0=1) P(G_1=1) + \\ &\quad P(X_i=0) P(X_i=0) P(F_0=1) P(G_0=1), \end{aligned} \quad (140)$$

and in general this does not coincide with the following strict value $$\begin{aligned} P(Z=1) &= P(X_i=1) P(F_1=1) P(G_1=1) + \\ &\quad P(X_i=0) P(F_0=1) P(G_0=1). \end{aligned} \quad (141)$$

This is because the relation equation of Boolean algebra such as $X_i X_i = X_i$, $X_i \bar{X}_i = 0$ can be satisfied with respect to the second line to the third line of the equation (139) and on the contrary such relation equation cannot be satisfied in general with respect to the probability $P(X_i=x)$ of real number. However, the condition $P(X_i=0) P(X_i=1) \leq$ERROR may assure that these relations of Boolean algebra can be satisfied with respect to the probability within allowable error.

If the signal which causes signal correlation is alone, the above error ERROR coincides with error in output of the gate. But if a plurality of correlations are caused on the upstream of the gate, and assume that a maximum allowable error specified for the output of the gate G is $E_G$, a maximum allowable error may be specified with respect to respective primary inputs $X_i$ so as to satisfy $$C_1E_1+C_2E_2+ \ldots +C_nE_n \leq E_G \tag{142}$$

when $E_G$ is not so large. Where $C_i$ is the number of correlation caused by the primary inputs $X_i$ (i=1, ..., n) in the upstream of the gate G when the logical circuit is developed by fundamental gates (e.g. AND gate and inverter). This relation equation is rough estimation because the relation of Boolean algebra must be used every correlation.

With the above, it will be expected that, when P(X=0)P(X=1) of input probability is small, output error in probability is also small. This fact has been confirmed under the condition no delay is caused in one bit adder. The result is summed up in the following table III.

TABLE III

| Input Probability | | | Output Probability A | | Output Probability B | | Error in Output Probability | |
|---|---|---|---|---|---|---|---|---|
| A | B | C | Sum | Carry | Sum | Carry | Sum | Carry |
| 0.5 | 0.5 | 0.5 | 0.483887 | 0.531250 | 0.5 | 0.5 | 0.016113 | 0.03125 |
| 0.95 | 0.95 | 0.95 | 0.858103 | 0.994893 | 0.8645 | 0.99275 | 0.006397 | 0.002143 |

Output probability A denotes probability of the output node named by SUM and CARRY which are calculated under the condition that all gate inputs are independent and signal correlation is neglected. Output probability B denotes their strict probability values. According to this table III, if P(X=0)P(X=0)(X=A, B, C) for inputs A, B, C is smaller, error in output probability becomes certainly smaller.

The above discussion has been made based on autocorrelation on two points. General autocorrelation on n points is given by $$P(X=x_1, t=i_1; X=x_2, t=i_2; \ldots, X=x_n, t=i_n)=[Q^{i1-i2}{}_{x1,x2}] \ldots [Q^{in-1-in}]_{xn-1,xn} P(X=x_n), \tag{143}$$

therefore $$|P(X = x_i, t = i_1; \ldots, X = x_j, t = i_j) \times \tag{144}$$

$$P(X = x_{j+1}, t = i_{j+1}; \ldots; X = x_n,$$

$$t = i_n)| \leq P(X = 0)P(X = 1)|1 - \alpha_0 - \alpha_1|^{ij-ij+1}$$

is satisfied. Thus the same discussion as autocorrelation on two points may be applied to the general case.

Based on the foregoing result, algorithm for calculating probability propagation with considering signal correlation and difference in delay time will be prepared as follows.

1) All gates are arranged in the order of preferential search of depth from the primary outputs. For respective gates G, following operations are carried out according to the order.

2) A maximum allowable error requested for the primary inputs is set correspondingly to a maximum allowable error specified for the gates G. A minimum difference in delay time in which correlation is negligible is calculated.

3) Inputs of G are classified into groups based on correlation on the logical circuit diagram.

4) For respective nodes $Y_i$ (i=1, ..., k) belonging to the same group, times from respective primary inputs $X_1$, $X_2$, ..., $X_n$ to $Y_i$ are calculated in every route while considering delay time.

For example, times has been calculated for the group $\{Y_1, Y_2, Y_3\}$.

TABLE IV

| | $Y_1$ | $Y_2$ | $Y_3$ |
|---|---|---|---|
| $X_1$ | 2,3,5 | | 9 |
| $X_2$ | 4 | 3,6 | 1 |
| $X_3$ | | 1,2,4 | 8 |
| $X_4$ | | | 8,4 |

Where numerical values in the items in this table represents delay time from respective primary inputs in every route.

5) If difference in delay time during when all primary inputs reach $Y_i$, $Y_j$ is more than the minimum difference in delay time calculated in item 2), correlation between $Y_i$, $Y_j$ may be disregarded. Then, the inputs of G classified into groups in item 3) are classified into further detailed groups such that the inputs of G correlations of which cannot be disregarded are included into the same groups. For instance, in the above table, detailed groups are $\{Y_1, Y_2\}$, $\{Y_3\}$ in the event that the minimum difference in delay time in which correlation is negligible has been respectively 3, 2, 4, 2 with respect to the primary inputs $X_1$, $X_2$, $X_3$, $X_4$.

6) Calculation is carried out while considering correlation every detailed classified group. Probability calculation of the output of G is implemented on the assumption respective groups are independent.

Such detailed classification entails reduction in calculation time and labor by employing the results of prior calculation. For example, in the circuit in FIG. 3, if correlation of $X_i$ is negligible, the following calculation $$P(Z=1)=P(Y_1=1)P(Y_2=1) \tag{145}$$

can be implemented by employing already calculated value $P(Y_1=1)$, $P(Y_2=1)$. But unless correlation of $X_i$ is negligible, the calculation has to be made by more complicated method.

Figure 5:
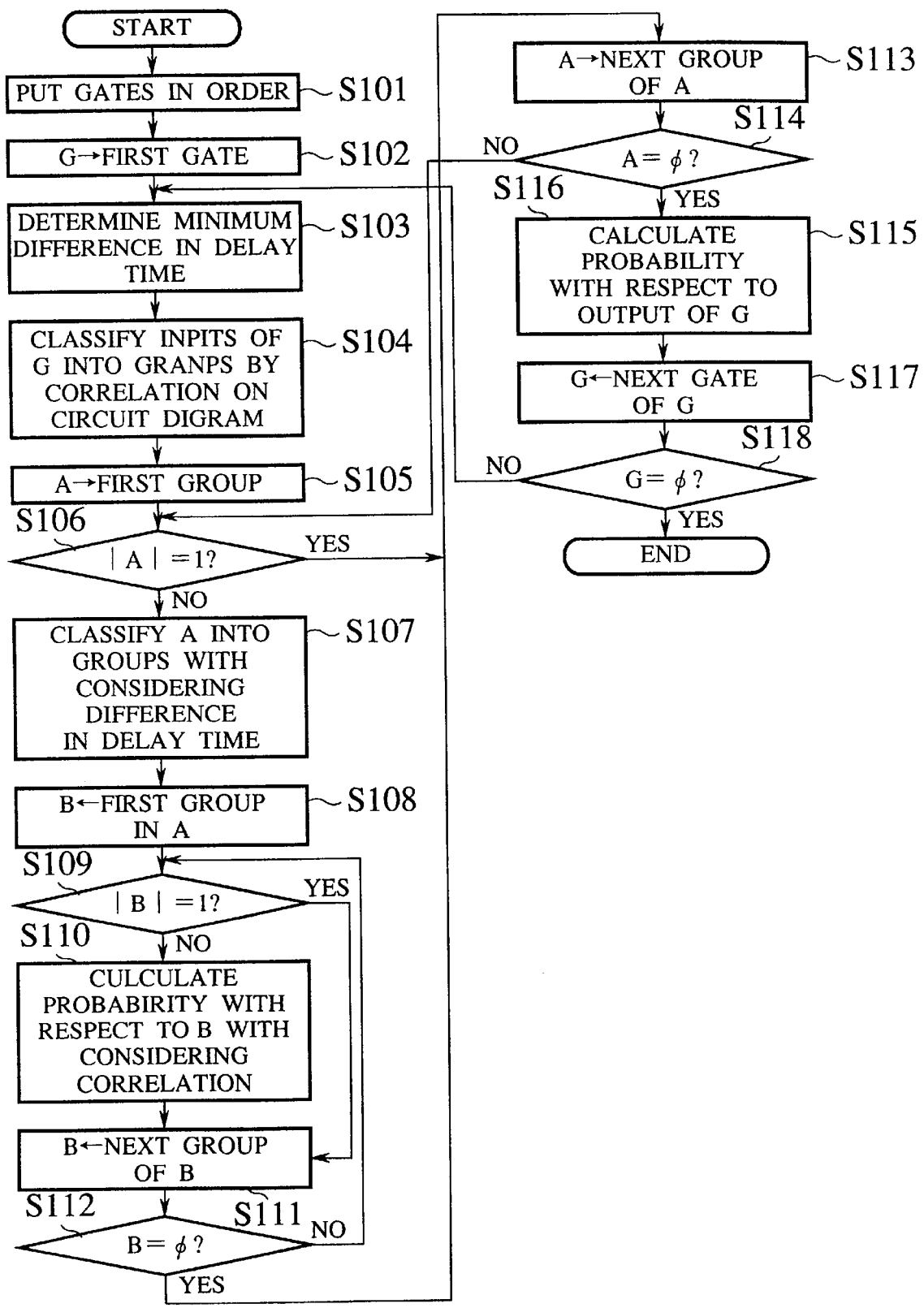
FIG. 5 is a flowchart illustrating process procedures according to a second embodiment of the present invention.

In FIG. 5, the above algorithms are summarized. Calculation time for the algorithm is dependent on the delay time of the circuit and respective gates and the request maximum allowable error. In the worst case, it is $O(|G| \times X)$ whereas in the best case it is $O(|G|)$. Where $|G|$ is the number of gates included in the entire circuit, and X is time required for procedures in item 6) in the worst case.

Sixth Embodiment

In the fifth embodiment the signal probability has been discussed, but in the sixth embodiment the transition probability will be explained. For the sake of simplicity, the circuit excluding the sequential circuit (combinational circuit) will be considered. In the circuit shown in FIG. 6, if the transition probability $P(X_i=x|X_i=y)$ of independent primary inputs $X_i$ are given, the transition probability of the output Z will be calculated. Where, $$P(X=x|x=y)=P(X=x, t=1|X=y, t=0) \tag{146}$$

is defined. If the delay time is ignored, then obviously $$P(Z=1|Z=1)=P(X_1=1|X_1=1) \times P(X_2=1|X_2=1)P(X_3=1|X_3=1) \quad (147)$$

is obtained. However, Z has the signal value 1 at time t=0 if respective gates have delay times in the magnitude of 2, and the probability that Z has the signal value 1 at time t=1 is given by $$P(Z = 1, t = 1; Z = 1, t = 0) = P(X_1 = 1, t = -3; X_1 = 1, \quad (148)$$

$$t = -4) \times P(X_2 = 1, t = -3; X_2 = 1, t = -4;$$

$$X_2 = 1, t = -7; X_2 = 1, t = -8) \times P(X_3 = 1, t = -7, X_3 = 1, t = -8).$$

If autocorrelation of the signal $X_2$ with respect to time is very small, and the signals being discrete for time in excess of 3 can be regarded as independent, $$P(X_2 = 1, t = -3; X_2 = 1, t = -4; X_2 = 1, t = -7; X_2 = 1, \quad (149)$$

$$t = -8) \sim P(X_2 = 1, t = -3; X_2 = 1, t = -4) \times P(X_2 = 1,$$

$$t = -7; X_2 = 1, t = -8) = P(X_2 = 1|X_2 = 1)^2 P(X_2 = 1)^2$$

is achieved, which is similar to the result of $$\begin{aligned} P(Z = 1|Z = 1) &= P(Y_1 = 1|Y_1 = 1)P(Y_2 = 1|Y_2 = 1) \quad (150) \\ &= P(X_1 = 1|X_1 = 1)P(X_2 = 1|X_2 = 1)) \times \\ &\quad (P(X_2 = 1|X_2 = 1)P(X_3 = 1|X_3 = 1)) \end{aligned}$$

calculated with regarding Y1, Y2 to be independent in FIG. 6.

Like the case of the signal probability, it can be decided by calculating autocorrelation whether or not correlation between the transition probability is present, and the same algorithm as in the fifth embodiment may be applied to the transition probability.

As above, embodiments of the second invention have been discussed. In case the minimum time unit τ is set to be the clock cycle, the combinational circuit having the difference in delay time of one or more is decided as an inoperable circuit from general points of view. However, if a storage device such as flip-flop is inserted prior to correlation procedure, the circuit becomes a normally operable circuit even if it has difference in delay time exceeding 1. Application range of the second invention may be widely spread if applying the sequential circuit together.

Seventh Embodiment

An estimation method for power consumption according to an embodiment of the third invention will be explained with reference to a flowchart in FIG. 8. The input signals provided to input terminals of the logical circuit are described in time series, and are stored in a storing unit 801. In step S802, input patterns are divided into time intervals every terminal, and input signal series in respective time intervals are converted into probability quantity. Quantity of probability to be calculated is different according to quantity of estimated objects. There are, as objectives, the signal probability representing probability that the signal takes the logical value "1" or the switching probability (transition probability) representing probability that the signal changes in response to the number of possible cases of the signal. The quantity of probability calculated in respective time intervals is stored in a storing unit 803. In step S804, power in the time interval ia calculated from the quantity of the probability which is provided to input terminals in each time interval. The results are stored in a storing unit 806 on the basis of the time intervals and classification of the partial circuits according to the present invention. In step S805, it is determined whether or not power calculation in step S804 is completed over designated entire time intervals. If YES, entire processes are terminated. S807 is an example of an output graph represented in time series.

Figure 9:
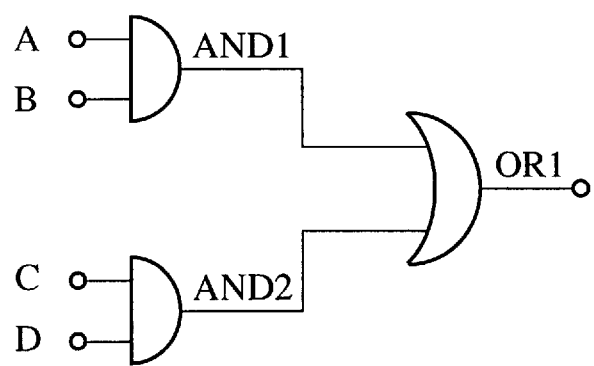
FIG. 9 is a circuit diagram illustrating an example of a logic circuit for purposes of explaining the process contents in the third embodiment of the present invention.
Figure 10:
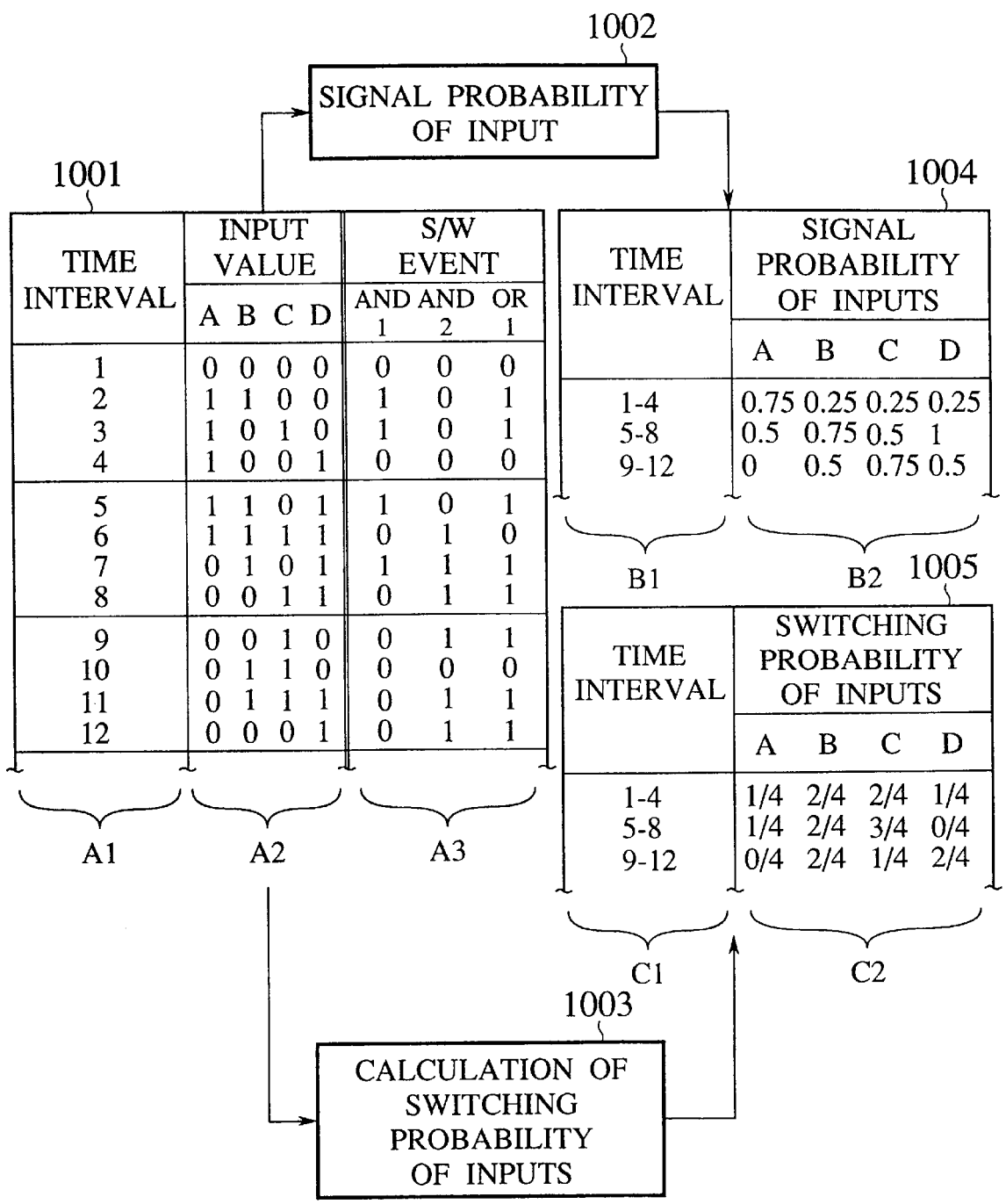
FIG. 10 is a view showing the process contents in step S802 in FIG. 8 according to the third embodiment of the present invention.
Figure 12A:
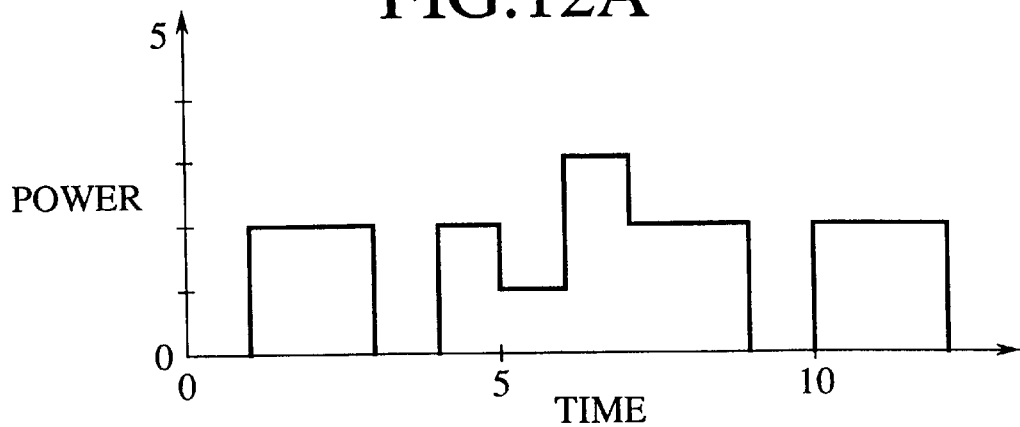
FIGS. 12A to 12C are charts illustrative of examples of the results of power estimation with respect to three kinds of time intervals according to the third embodiment of the present invention.
Figure 12B:
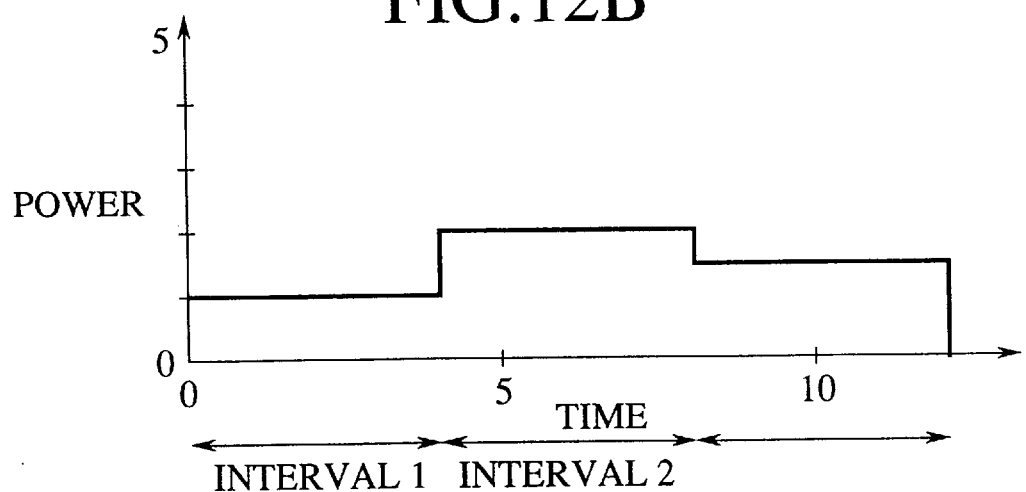
Figure 12C:
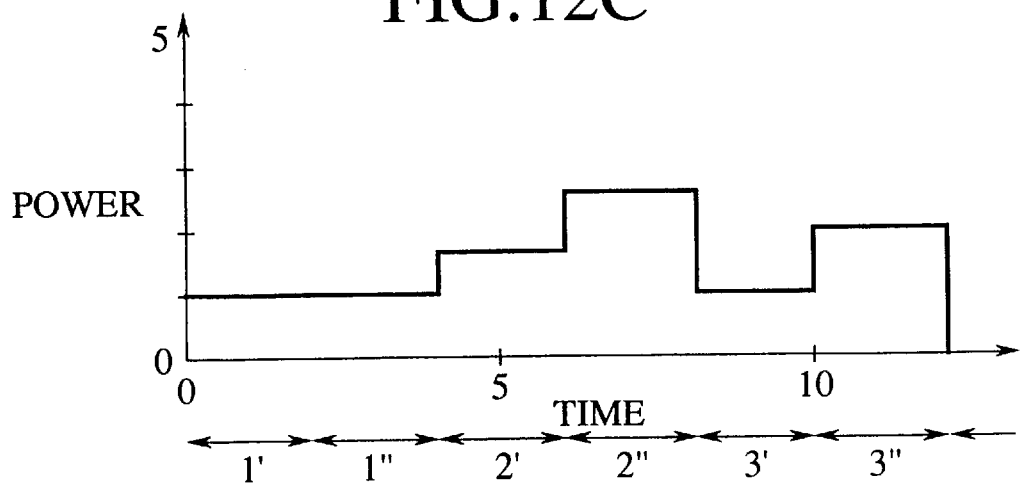

An embodiment of power consumption estimation according to the present invention will be explained by way of example of the logical circuit which is composed of two AND gates AND1 and AND2 and one OR gate OR1. By employing the particular circuit and input patterns, FIG. 10 illustrates process of partitioning the circuit into intervals for input pattern in step S802 in FIG. 8 and process of calculating the quantity of probability such as calculation of the signal probability in the interval for the input terminal. 1001 in FIG. 10 shows input patterns and switching events. A column of A2 is input patterns stored in a storing unit 801, and a column of A1 is time. A column of A3 shows swichings occurred on the outputs of the gates in the circuit in FIG. 9. As shown in column B2, input patterns in the column of A2 may be converted into the signal probability of respective input terminals according to calculation procedures of the signal probability of inputs in 1002 over time intervals shown in the column of B1 in 1004. Also, as shown in a column of C2, the input patterns in the column of A2 may be converted into the switching probability of respective input terminals by the switching probability calculating means 1003. Procedures in 1002, 1003 correspond to the process in step S802 in FIG. 8. The probability quantity obtained by the procedures in 1002, 1003, i.e., B2 in 1004 and C2 in 1005 are stored in a storing unit 803 in FIG. 8. The switching probability in FIG. 11A is obtained as the results of instantaneous power calculated in step S804 in FIG. 8 over the interval, and stored in a storing unit 806. In the embodiment in FIG. 11A, the switching probability of the output nodes in respective gates and their sum are calculated. FIG. 11B shows an example wherein calculation has been effected with respect to more detailed time intervals to improve resolution of the instantaneous power. FIG. 12 shows as a graph the results obtained by applying power estimation method as the embodiment of the present invention to concerned circuit and input patterns. An increment of the time interval is set to be 1 in FIG. 12A, the increment of the time interval is set to be 4 in FIG. 12B, and the increment of the time interval is set to be 2 in FIG. 12C. This display correspond to the display 808 in FIG. 8. In the examples of power calculation in FIGS. 12 and 13, assumptions have been made that all electrostatic capacitances of the output nodes of respective gates are set at 1 for the sake of simplicity, and logical amplitude is within 0 to 1. These assumptions are made for easy understanding, but separately prepared electrostatic capacitances and logical amplitudes of the output nodes must be used in actual power estimation.

Figure 8:
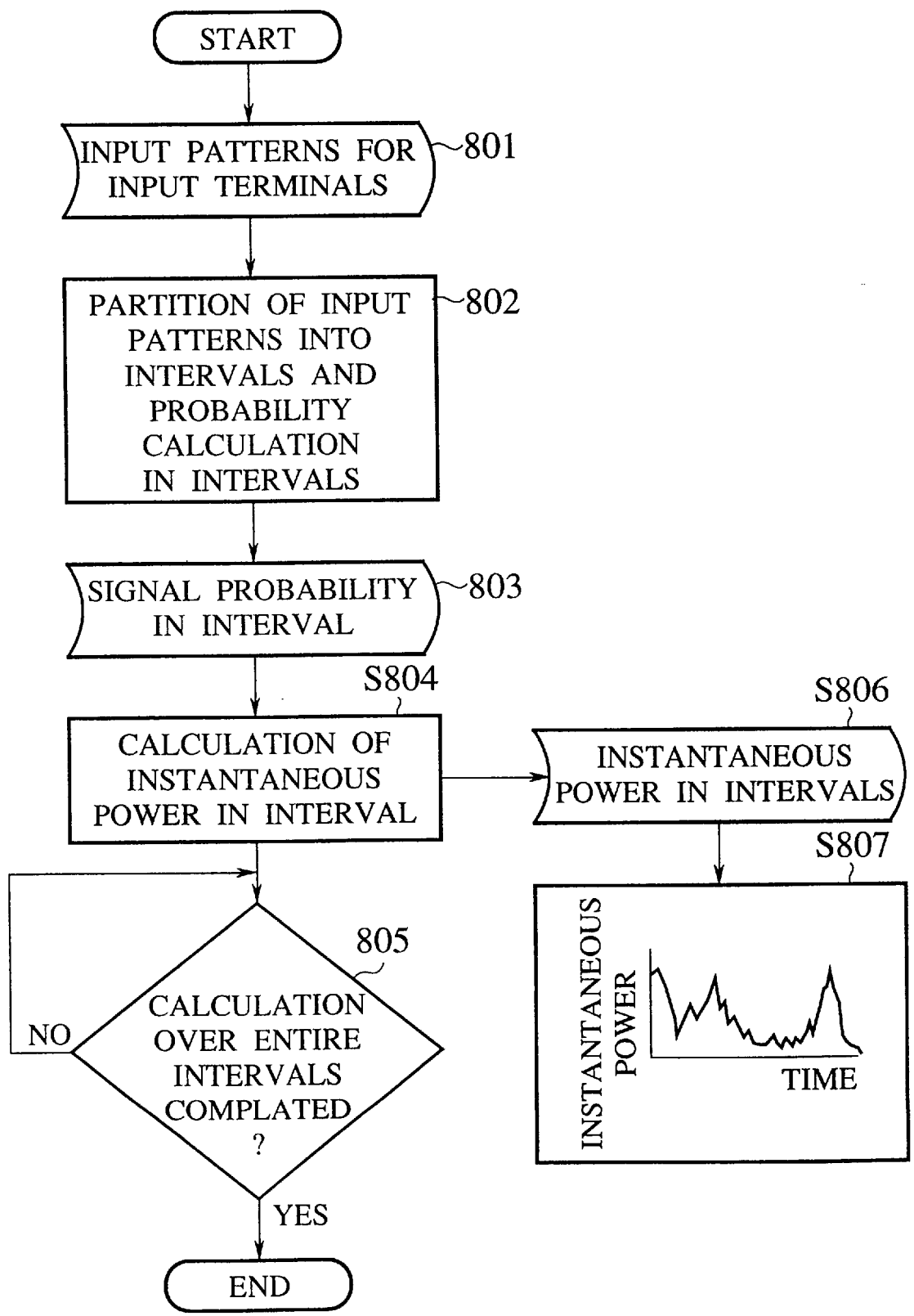
FIG. 8 is a flowchart illustrating process procedures according to a third embodiment of the present invention.

FIG. 8 is a flowchart illustrating an embodiment which is implemented by the ordinary computer. In the embodiment wherein the third invention is embodied by the hardware or more than two processing apparatuses, steps S802, S804, and S807 in FIG. 8 is formed in pipeline fashion. Respective storing units, i.e., storing unit 801, storing unit 803, storing unit 806 can be formed as a first-in first-out buffer.

In the ninth embodiment, uniform time intervals are not always requested. According to required precision, fine time interval may be set on the part in which details are needed.

Eighth Embodiment

Figure 14:
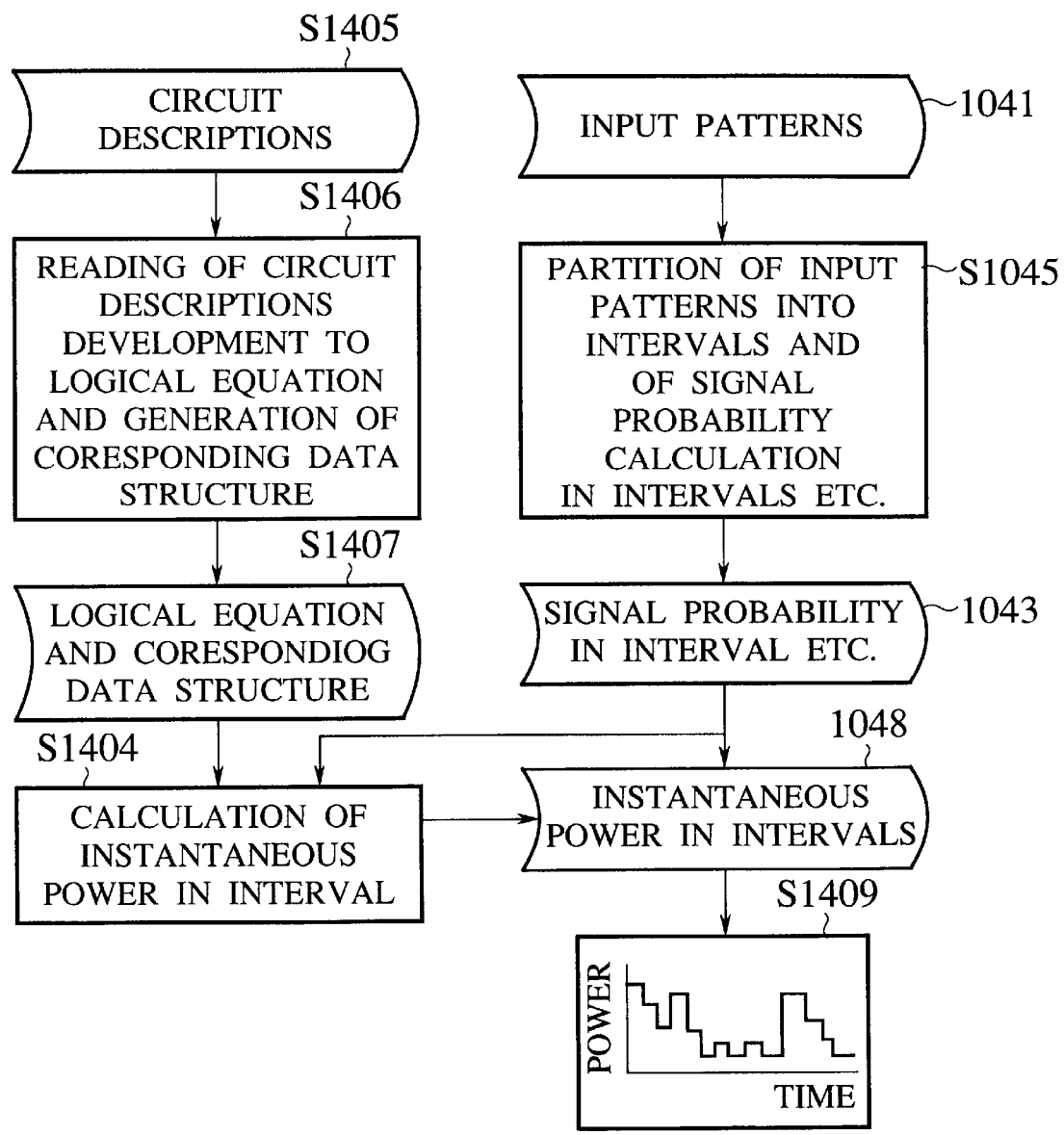
FIG. 14 is a schematic view showing a system configuration according to the third embodiment of the present invention.

A second embodiment of the third invention will be explained with reference to a system configuration diagram in FIG. 14. In the system configuration diagram, 1405 denotes a storing unit for storing the circuit structure and description of operation. More particularly, the storing unit 1405 stores the circuit structures in the format which is suitable for step S1404 of process procedure for calculating power by providing the probability quantity to input terminals of the logical circuit, and stores data to be input to step S1406 of process procedure for converting operational description. In step 1406, various processes such as generation/transformation of the logical formula based on operational description to facilitate power calculation by virtue of probability calculation, partition of the circuit, generation of expression of the logical formula by BDD, calculation of electrostatic capacity of the output nodes in the logical gates to calculate detailed power, and coupling of calculation procedures are carried out. These information are stored in a storing unit 1407, which is utilized in step S1404 for implementing calculation procedures of instantaneous power. In the module for implementing this calculation procedures of instantaneous power, power calculation of the same circuit must be repeated in respective time intervals to consume much calculation time. For this reason, in the eighth embodiment, by preparing in advance in step S1406 so as to execute optimum calculation, entire process time can be lessened. 1401, S1404, 1403, 1408, S1409, and 1410 correspond respectively to 801, S802, 806, S807, and 808 in FIG. 8.

Ninth Embodiment

Figure 13A:
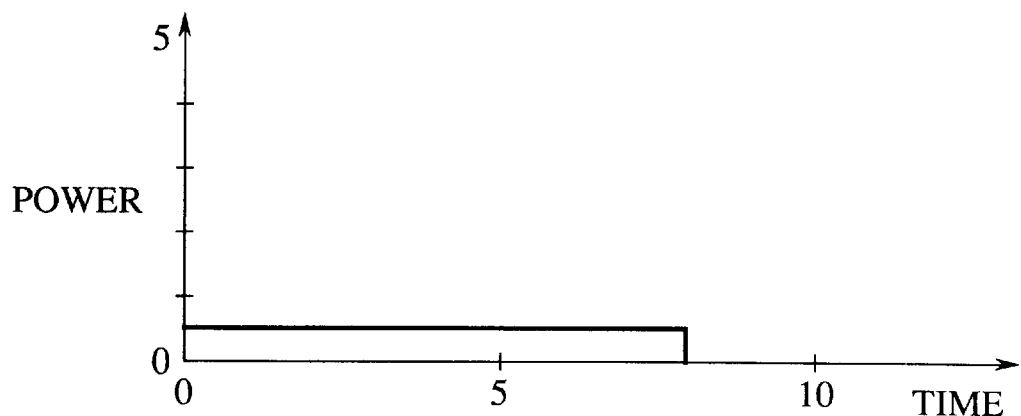
FIGS. 13A and 13B are charts illustrative of powers required for partial circuits according to the third embodiment of the present invention.
Figure 13B:
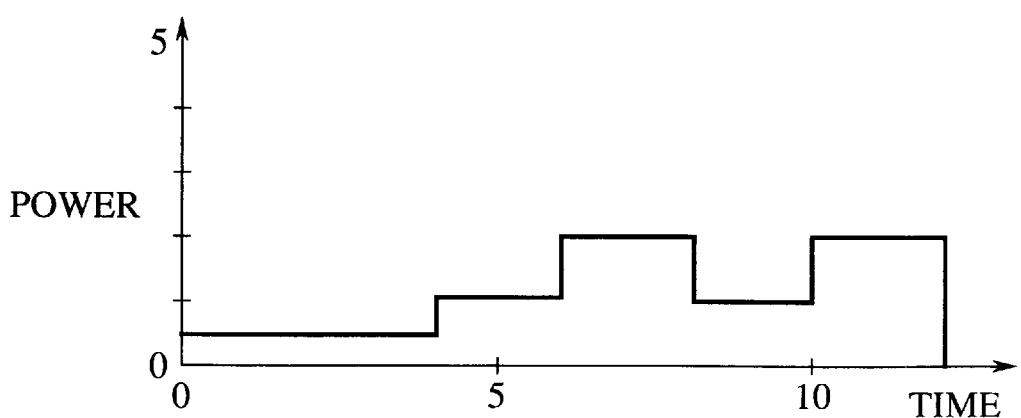

Subsequently, a first embodiment of the third invention will be explained with reference to FIGS. 11 and 13. The result of calculation implemented in step S804 in instantaneous power calculation process has been stored in the storing unit 806. Upon storing the results, data structure has been stored as the switching probability every partial circuit, as shown in FIG. 11. By storing the results as such data structure, time transition of power every partial circuit may be displayed, as shown in FIG. 13.

As a criterion for partitioning the circuit into the partial circuits, design hierarchy employed by the present designer is the most popular instance. But in the circuit including several kinds of clock systems, such a method for classifying the circuit into partial circuits according to respective clock systems can be implemented. The present invention may be effectively implemented by selecting such a data structure that respective nodes of the circuits can be retrieved and classified according to design hierarchy, power-supply system, clock system, etc. of the circuit.

In the above embodiment, the part corresponding to step S804 in FIG. 8 has employed the algorithm that provides quantity of the probability to input terminals of the logical circuit and then examines propagation state of the quantity of the probability to respective outputs of the gates. However, the algorithm of the part is not always limited to this scheme. Superiority of the present invention will not be damaged by any algorithm other than this algorithm. As an example of other algorithms, there is a method of carrying out the simulation of the circuit by generating short and random input patterns which may satisfy statistics and probability characteristics of input signals in respective time intervals. According to this method, if the statistics and probability characteristics of the input signals can be sufficiently expressed by short input patterns, it is feasible to estimate power effectively with good precision.

It would be obvious that the present invention may be applied to integrated circuits of circuit schemes other than CMOS. For instance, in E/D MOS circuit, current is being flown during when the logical values leading the output of the logical gates to "0" is applied to input terminals of the logical gates. Necessity will arise that, in power prediction, not only switching probability but also signal probability must be considered because of such intrinsic characteristic of the circuit. Moreover, the present invention may be applied to the circuit employing dynamic logic if evaluation scheme to enoughly consider precharge effect is introduced.

According to the first invention, the switching probability of respective nodes in the logical circuit can be calculated in comparable precision to conventional typical CCM and with calculation time less than one over several tens minutes.

In the event that capacitance for driving the node is provided, average power consumption in the node can be calculated when switching probability of the node is known. In addition, in the event that power consumption of the cell for input transition pattern of the cell is provided, it is possible to calculate probability of generation of input transition pattern according to the present invention, so that average power consumption of respective cells can be estimated.

Furthermore, by combining the present invention with logical synthesis tool, it is feasible to estimate power consumption in initial design stage such as RTL level.

By varying the logical circuit near the node having much power consumption estimated by virtue of the present invention, the present invention is useful to circuit optimization such as reduction of power consumption.

Since the present invention estimates power consumption in the logical circuit level, design change and kind of packages to be selected may be determined in relatively initial design stage.

According to the second invention, by neglecting signal correlation within the maximum allowable error which is specified considering difference in delay time and probability value of input, calculation of operating probability of the logical circuit may be reduced.

According to the third invention, transition of instantaneous power with respect to time can be obtained in short calculation time. The time interval can be established readily and change of power can be known with necessary time precision.

In addition, by optimizing extracted common parts of calculation required for respective time intervals repeatedly calculation time for power estimation can be further reduced to therefore improve the efficiency.

Furthermore, power consumption in respective parts of the integrated circuit can be derived individually and readily. As a result, the integrated circuit designer can optimize the integrated circuit easily.

The foregoing description of the preferred embodiments has been presented for purposes of illustration and description. It is not intended to be exhaustive or to limit the invention to the precise form described, and obviously many modifications and variations are possible in light of the above teaching. The embodiments were chosen in order to explain most clearly the principles of the invention and its practical application thereby to enable others in the art to utilize most effectively the invention in various embodiments and with various modifications as are suited to th particular use contemplated.

What is claimed is:

1. A method of estimating power required for an integrated circuit including a logical circuit constituted by connecting a plurality of logical gates, comprising the steps of:

calculating a probability quantity corresponding to output nodes of respective logical gates, said probability quantity representing a signal probability that logical values of said output nodes of respective logical gates are 1 and a switching probability that logical gates are changed;

expanding into a series a difference $P_e - P_a$ between a strict value $P_e$ of said probability quantity and a value $P_a$ calculated based on an assumption that all inputs of respective logical gates are independent, with respect to said probability quantity corresponding to entire input signals of said integrated circuit; and estimating power required for said integrated circuit by first calculating an infinite number of terms of said series as a correction term and then employing a value obtained by adding said correction term to said value $P_a$ as an approximate value of said probability quantity.

2. A method of estimating power required for an integrated circuit according to claim 1, wherein said step of estimating power required for said integrated circuit is performed by employing a value obtained by multiplying the switching probability of arbitrary nodes in said logical circuit by a driving capacity of said arbitrary nodes, a square of power-supply voltage and a clock frequency, as power consumption in said nodes because of their charging/discharging.

3. A method of estimating power required for an integrated circuit according to claim 1, wherein said step of estimating power required for said integrated circuit is performed by employing a value obtained by multiplying a probability that arbitrary input transition patterns are generated in arbitrary gates of said logical circuit by power consumption every transition if said arbitrary input transition patterns are generated, as average power consumption in said gates because of their input transition.

4. A method of estimating power required for an integrated circuit according to claim 1, and further comprising the steps of:

classifying partial circuits of said integrated circuit acting as a unit of estimation into respective attentional circuit systems; and outputting consumed power and power-supply current to desired partial circuit sets.

5. A method of estimating power required for an integrated circuit including a logical circuit constituted by connecting a plurality of logical gates, comprising the steps of:

partitioning said logical circuit into logical module sets consisting of a plurality of logical gates;

representing logical values of respective nodes belonging to respective logical modules as a logical function of input signals of said logical modules, and then calculating a probability quantity corresponding to nodes of the respective logical modules and representative of a signal probability and a switching probability;

expanding into a series a difference $P_e - P_a$ between a strict value $P_e$ of said probability quantity and a value $P_a$ calculated based on an assumption that all inputs of the respective logical modules are independent, with respect to said probability quantity corresponding to entire input signals of said integrated circuit; and estimating power required for said integrated circuit by first calculating an infinite number of terms in said series as a correction term and then employing a value obtained by adding said correction term to said value $P_a$ as an approximate value of said probability quantity.

6. A method of estimating power required for an integrated circuit according to claim 5, wherein said step of estimating power required for said integrated circuit is performed by employing a value, obtained by multiplying the switching probability of arbitrary nodes in said logical circuit by a driving capacity of said arbitrary nodes a, square of power-supply voltage and a clock frequency, as power consumption in said nodes because of their charging/discharging.

7. A method of estimating power required for an integrated circuit according to claim 5, wherein said step of estimating power required for said integrated circuit is performed by employing a value, obtained by multiplying a probability that arbitrary input transition patterns are generated in arbitrary gates of said logical circuit by a power consumption in every transition if said arbitrary input transition patterns are generated, as average power consumption in said gates because of their input transition.

8. A method of estimating power required for an integrated circuit by calculating a probability of level transition at respective nodes of said integrated circuit, comprising the steps of:

determining a minimum difference in delay time between a plurality of signals acting as input signals to gates in said integrated circuit;

classifying gate inputs into groups according to the determined minimum differences in delay time;

calculating a first transition probability considering a correlation within each of the respective groups of said classified gate inputs and disregarding the correlation between different groups of said classified gate inputs, and then calculating a second transition probability concerning gate outputs by virtue of the first calculated transition probability concerning said gate inputs;

assuming a Markov nature on a probability of signals at more than two nodes, where the nodes depend on an identical signal; and disregarding correlation of signals between these nodes within a predetermined maximum allowable error if a minimum difference in delay time between said signals at more than two nodes is sufficiently large, until said identical signal reaches these nodes.

9. A method of estimating power consumption in an integrated circuit, comprising the steps of:

storing input signals into primary input terminals of the integrated circuit in a storing unit;

partitioning the input terminals into an input pattern in time series with a time interval;

calculating a probability quantity of the input pattern provided to said primary input terminals at every time interval, the probability quantity representing at least one of a signal probability that logical values of output nodes of respective logical gates are 1 and a switching probability that logical gates are changed from 1 to 0;

storing the probability quantity calculated at every time interval in the storing unit;

calculating a power consumption in every time interval in a time series fashion as a function of the probability quantity;

storing the power consumption in every time interval in a time series pattern; and disregarding correlation of signals between more than two nodes which depend on an identical signal X if a probability concerning logical values of said identical signal X satisfies a condition $P(X)P(X) \leq \text{Error}$, wherein Error is a predetermined maximum allowable error, $P(X)$ is a probability that said identical signal X is a logical value 0, and $P(X)$ is a probability that said identical signal X is a logical value 1.

10. A method of estimating power required for an integrated circuit, comprising the steps of:

storing into a storing unit descriptions of at least one of a circuit structure and a circuit operation of said integrated circuit;

prior to the storing step, converting the descriptions into at least one of an evaluation equation and a data structure required for power estimation;

estimating power of said integrated circuit by
- partitioning input terminals of said integrated circuit into an input pattern in time series with a time interval;
- calculating a probability quantity of the input pattern provided to said primary input terminals at every time interval, the probability quantity representing at least one of a signal probability that logical values of said output nodes of respective logical gates are 1 and a switching probability that logical gates are changed from 1 to 0;
- calculating a power consumption in every time interval in a time series fashion as a function of the probability quantity; and utilizing said evaluation equation or said data structure several times to estimate power.

* * * * *